United States Patent [19]
Lu et al.

[11] Patent Number: 6,154,581
[45] Date of Patent: Nov. 28, 2000

[54] MULTIPLE PORT, FIBER OPTIC CIRCULATOR

[75] Inventors: Liang-Ju Lu, Eden Prairie, Minn.; B. Barry Zhang, Lawrenceville, N.J.

[73] Assignee: ADC Telecommunications, Inc., Minnetonka, Minn.

[21] Appl. No.: 09/181,142

[22] Filed: Oct. 27, 1998

[51] Int. Cl.[7] .................................................. G02B 6/00
[52] U.S. Cl. ............................................. 385/11; 359/484
[58] Field of Search .................................. 385/10–15, 18, 385/31; 359/495, 618, 249, 281, 484, 488

[56] References Cited

U.S. PATENT DOCUMENTS

| | | |
|---|---|---|
| 4,272,159 | 6/1981 | Matsumoto . |
| 4,294,509 | 10/1981 | Nagao . |
| 4,464,022 | 8/1984 | Emkey ..................... 359/484 |
| 4,482,202 | 11/1984 | Nagao . |
| 4,762,384 | 8/1988 | Hegarty et al. . |
| 4,988,170 | 1/1991 | Buhrer . |
| 4,991,938 | 2/1991 | Buhrer et al. . |
| 5,204,771 | 4/1993 | Koga . |
| 5,212,586 | 5/1993 | Van Delden . |
| 5,319,483 | 6/1994 | Krasinski et al. . |
| 5,471,340 | 11/1995 | Cheng et al. ............. 359/281 |
| 5,574,596 | 11/1996 | Cheng . |
| 5,588,078 | 12/1996 | Cheng et al. . |
| 5,642,447 | 6/1997 | Pan et al. . |
| 5,682,446 | 10/1997 | Pan et al. . |
| 5,689,593 | 11/1997 | Pan et al. . |
| 5,729,377 | 3/1998 | Bergmann ............. 359/249 |
| 5,923,472 | 7/1999 | Bergmann ............. 359/618 |
| 6,026,202 | 2/2000 | Chang ..................... 385/11 |

FOREIGN PATENT DOCUMENTS

| | | |
|---|---|---|
| 0 215 973 | 9/1985 | European Pat. Off. . |
| 0 874 263 | 10/1998 | European Pat. Off. . |
| 0 915 358 A2 | 5/1999 | European Pat. Off. . |
| 0 965 867 | 12/1999 | European Pat. Off. . |
| 09 258136 | 10/1997 | Japan . |
| 2 304 203 | 3/1997 | United Kingdom . |
| WO 95/16216 | 6/1995 | WIPO . |
| WO 97/05518 | 2/1997 | WIPO . |
| WO 97/22034 | 6/1997 | WIPO . |
| WO 98/23983 | 6/1998 | WIPO . |

OTHER PUBLICATIONS

Shiraishi, *Polarization—Independent In–Line Optical Isolator with Lens–Free Configuration*, Dec. 10, 1992, No. 12, New York, US, pp. 1839–1842.

*Primary Examiner*—Akm E. Ullah
*Attorney, Agent, or Firm*—Altera Law Group LLC

[57] ABSTRACT

A reflective circulator includes a birefringent splitting and combining element, a non-reciprocal polarization rotator, and birefringent translating element. Some embodiments of the circulator include an inverting reflector. The circulator can be scaled to have a large number of ports arranged in a one dimensional array or in a two dimensional pattern, such as an array.

47 Claims, 18 Drawing Sheets

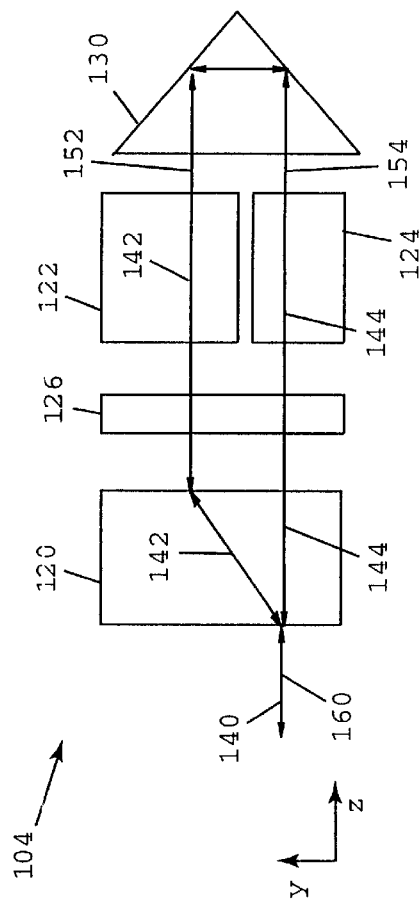
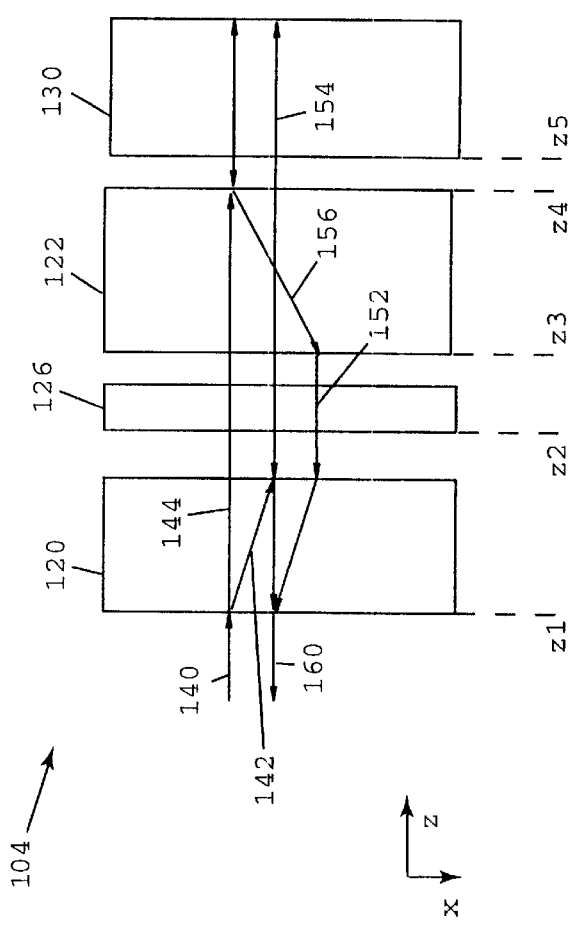

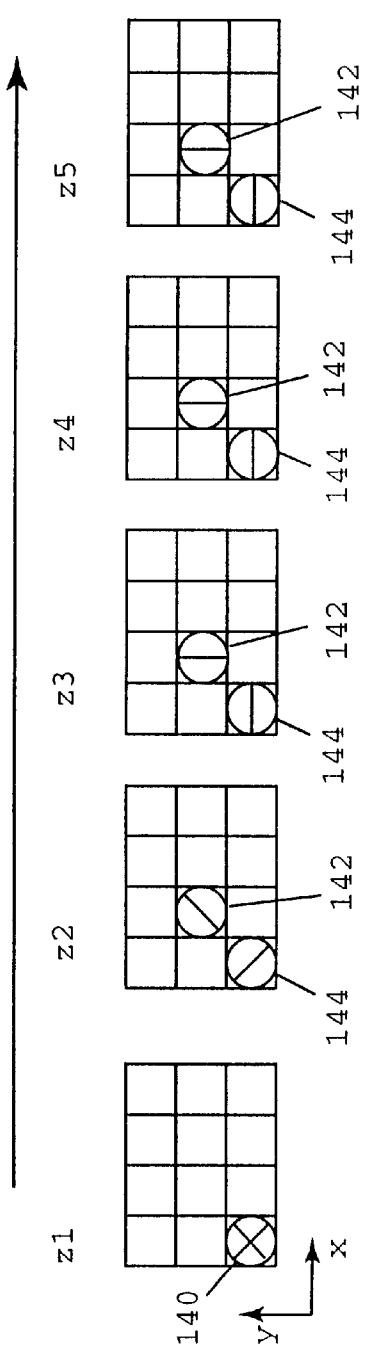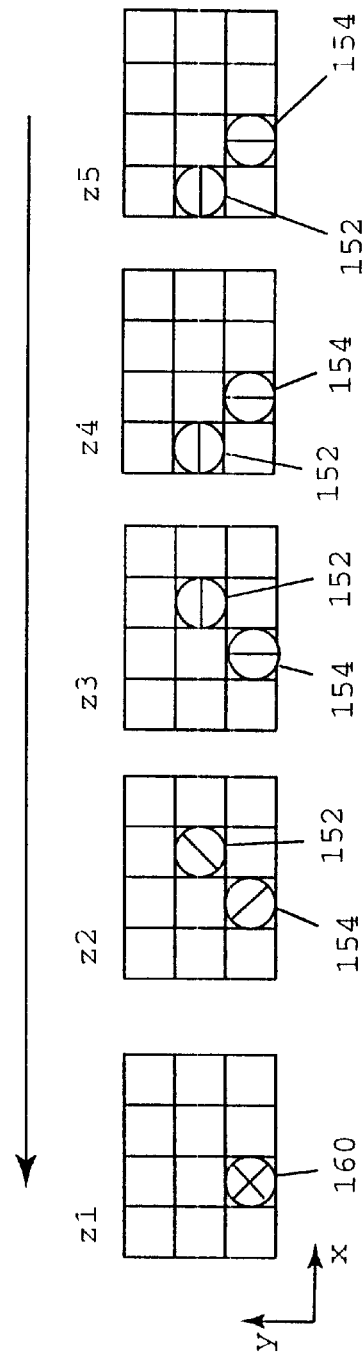

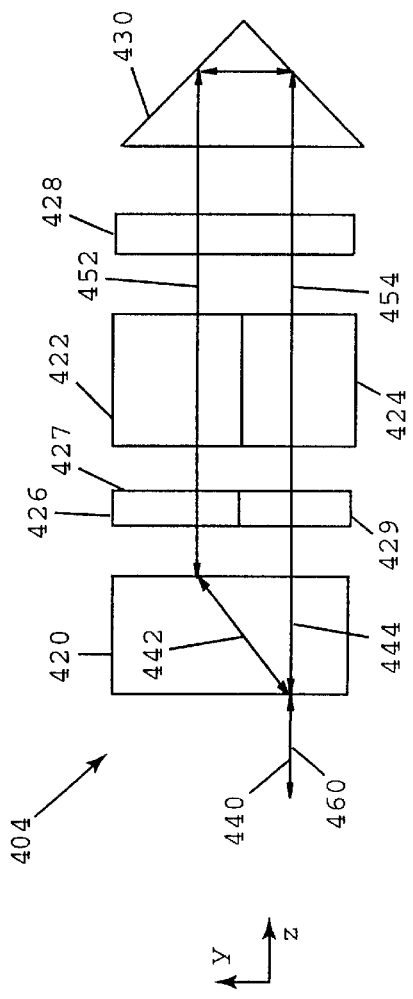
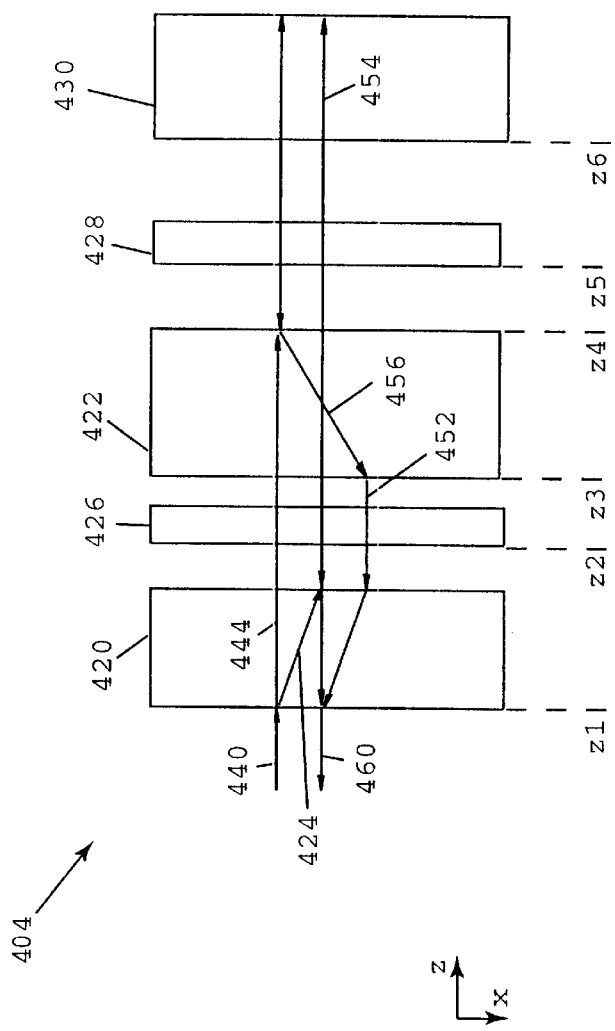

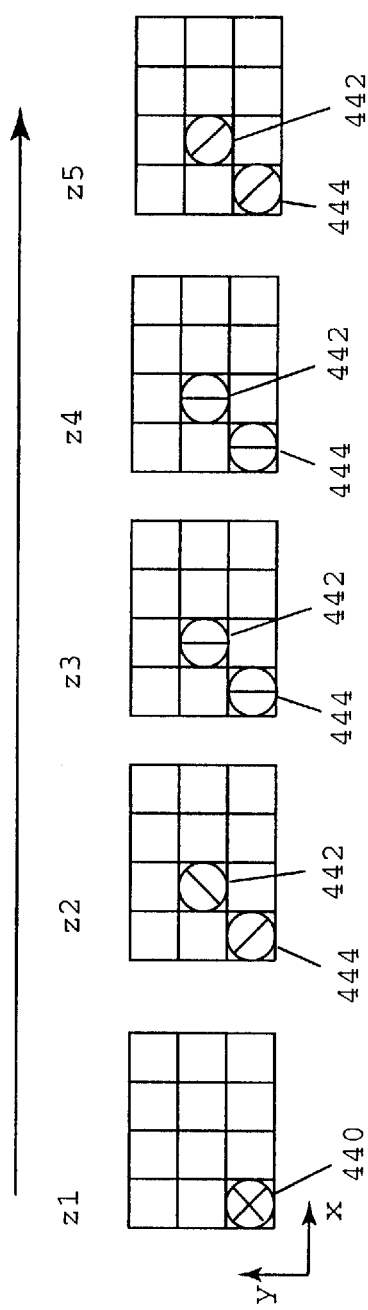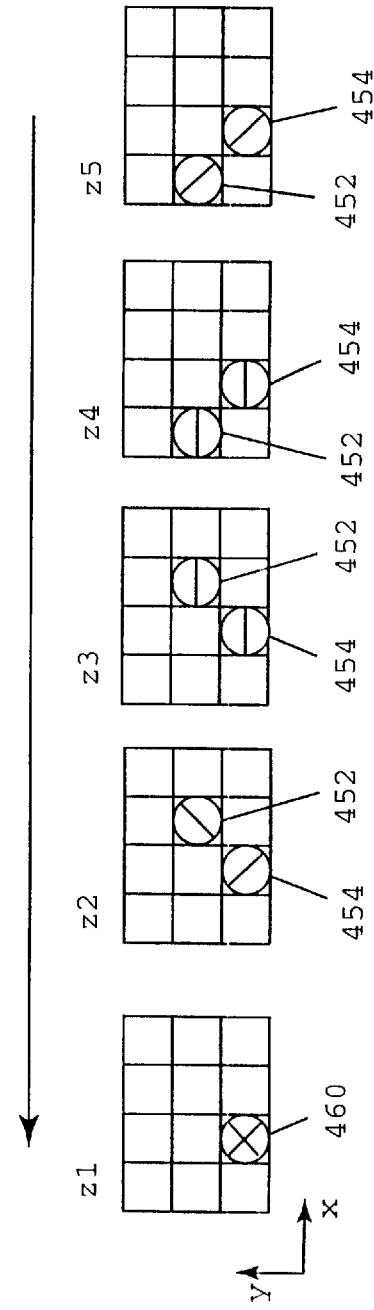

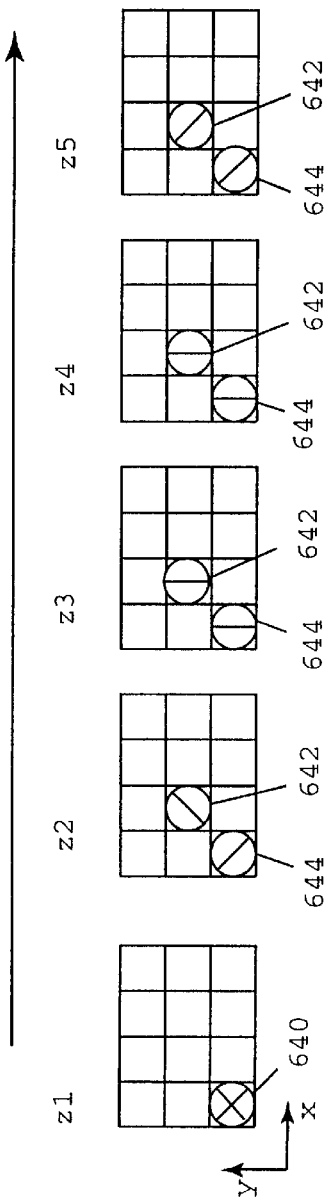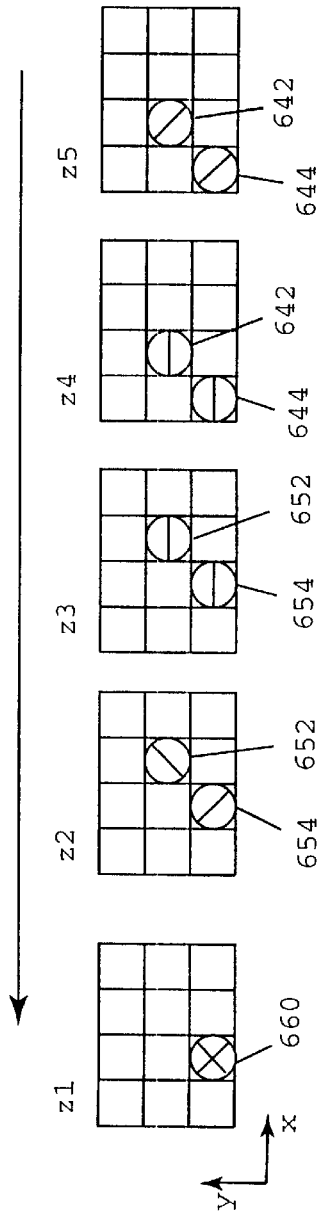

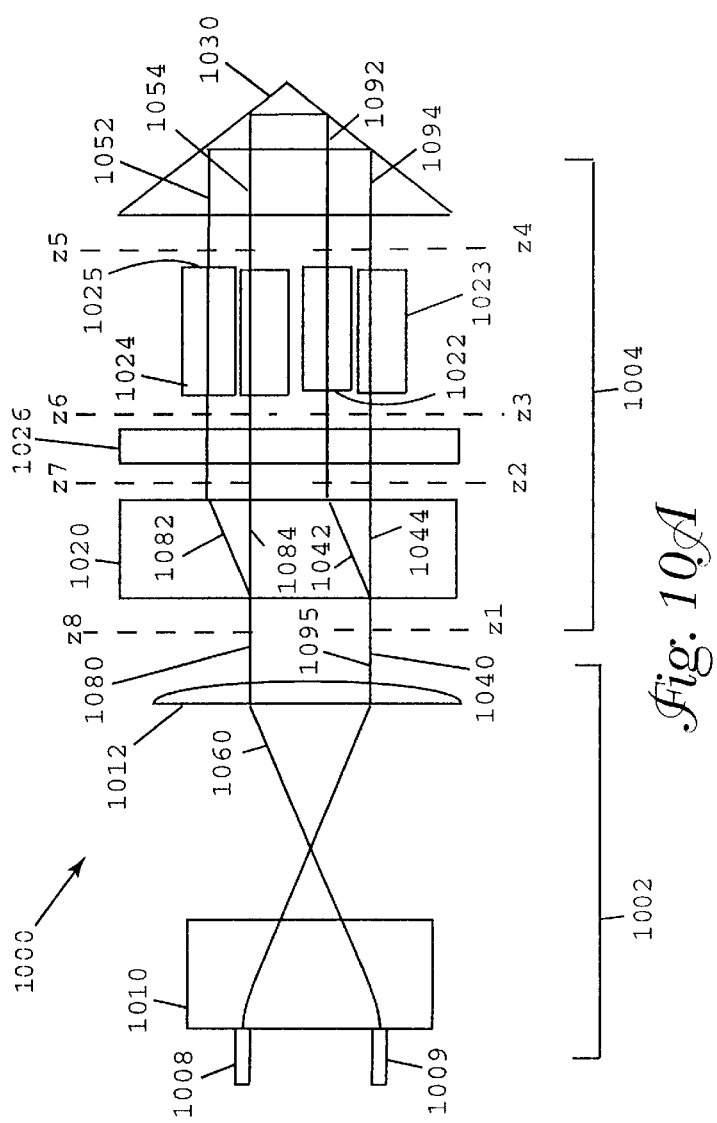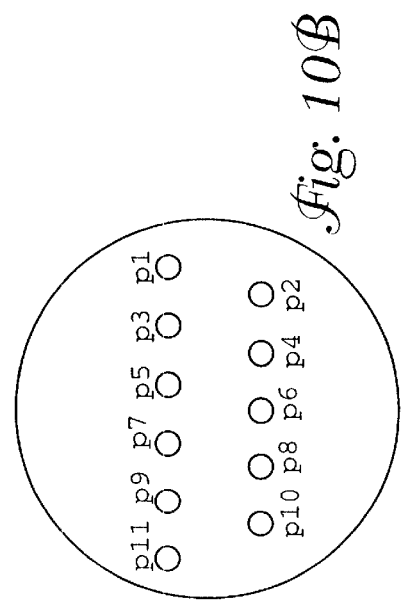

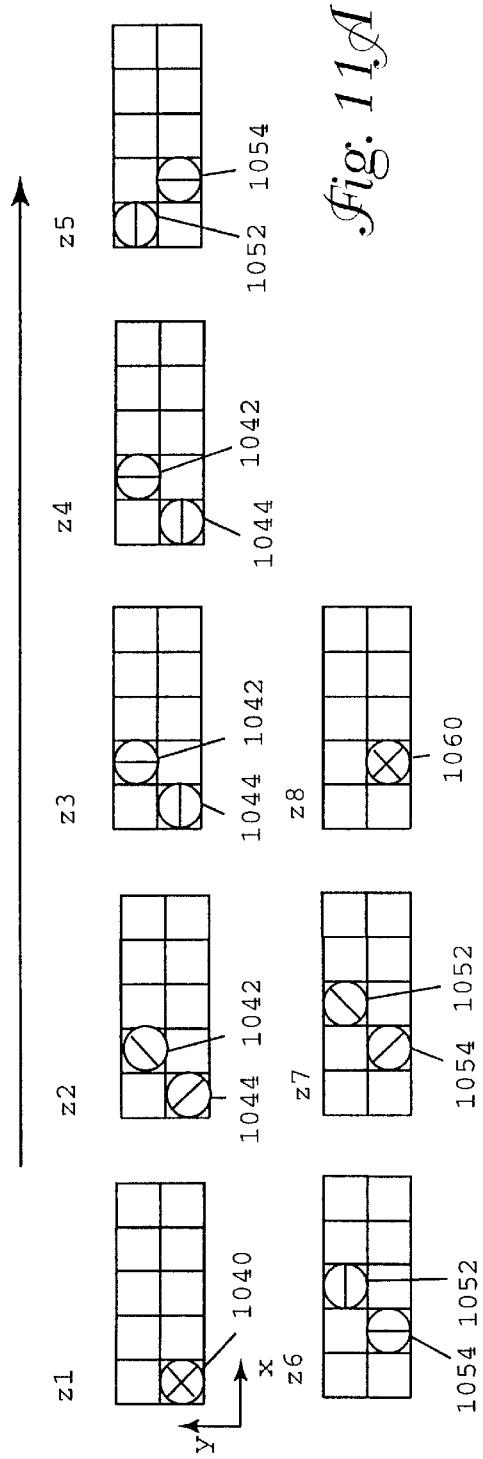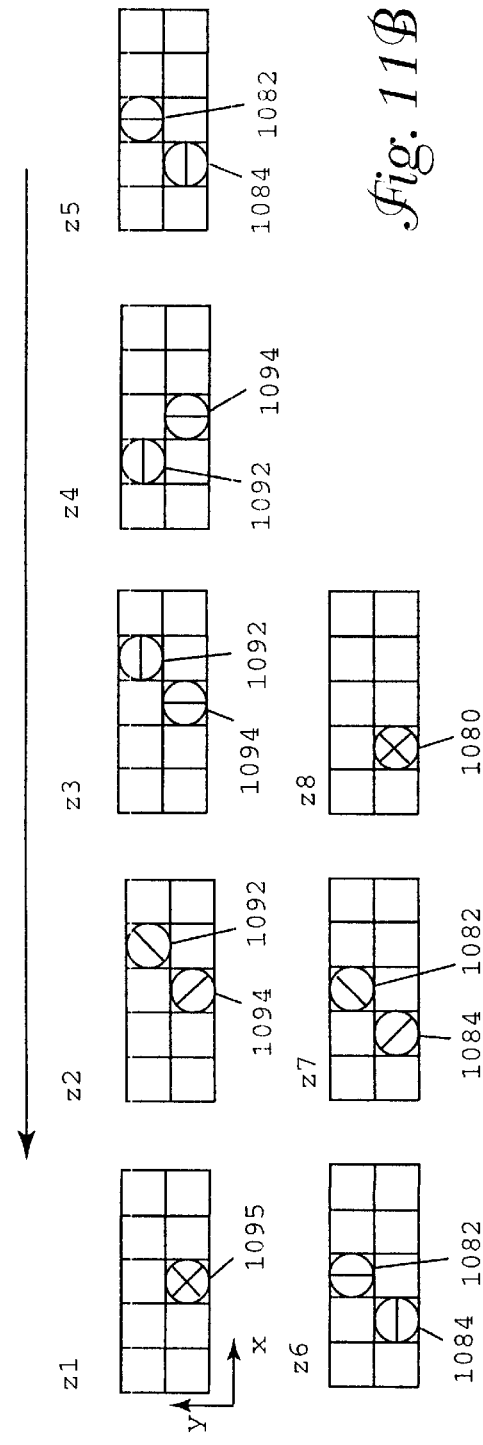

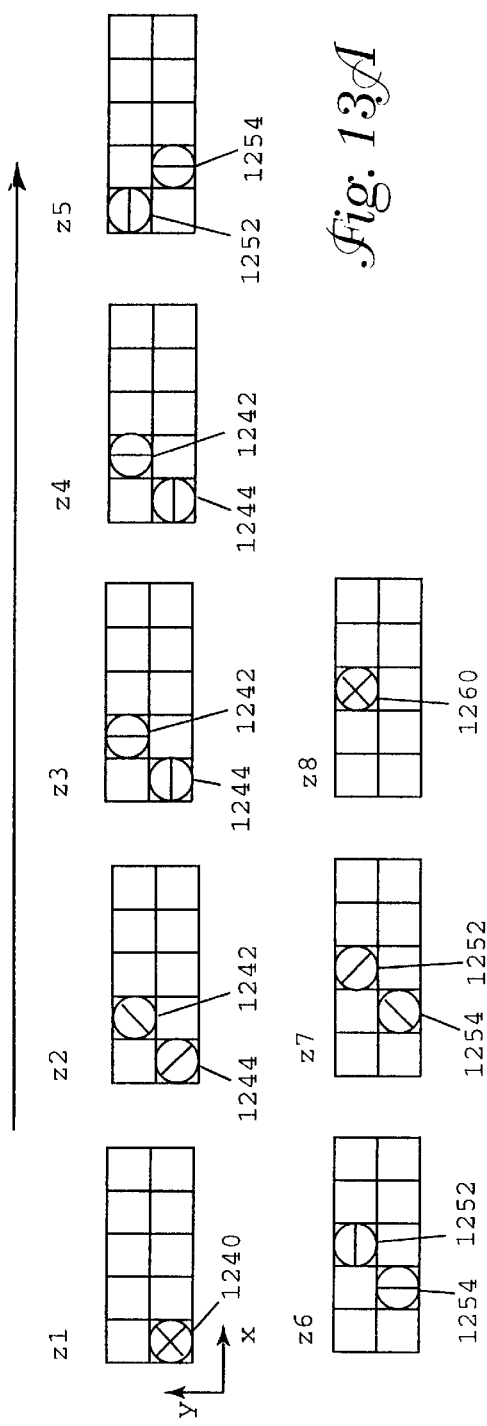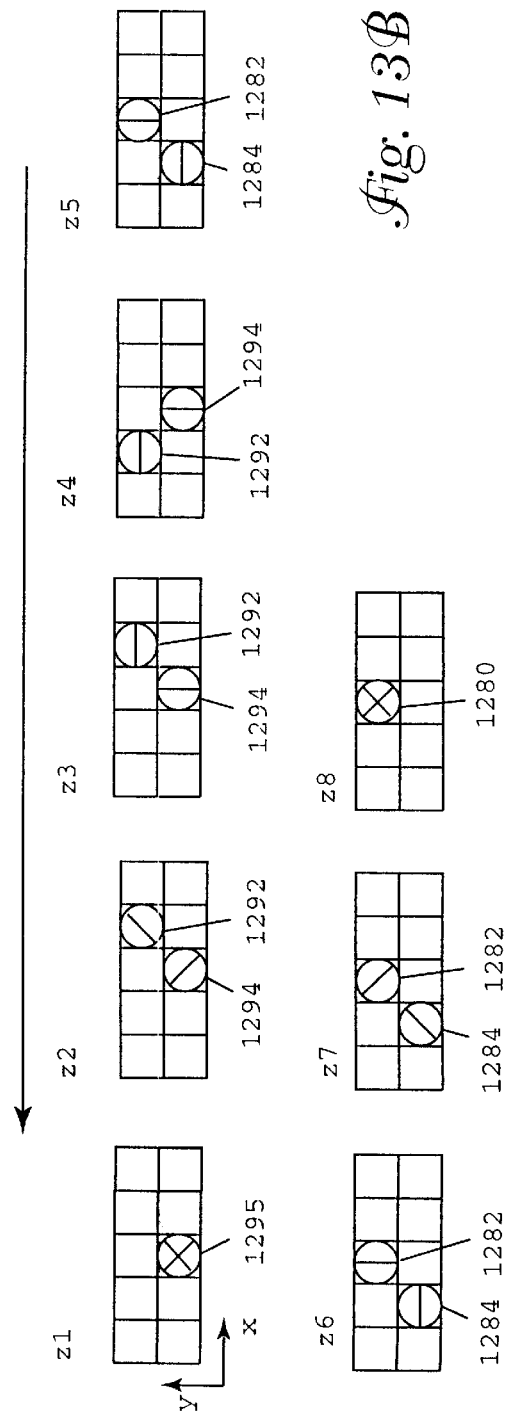

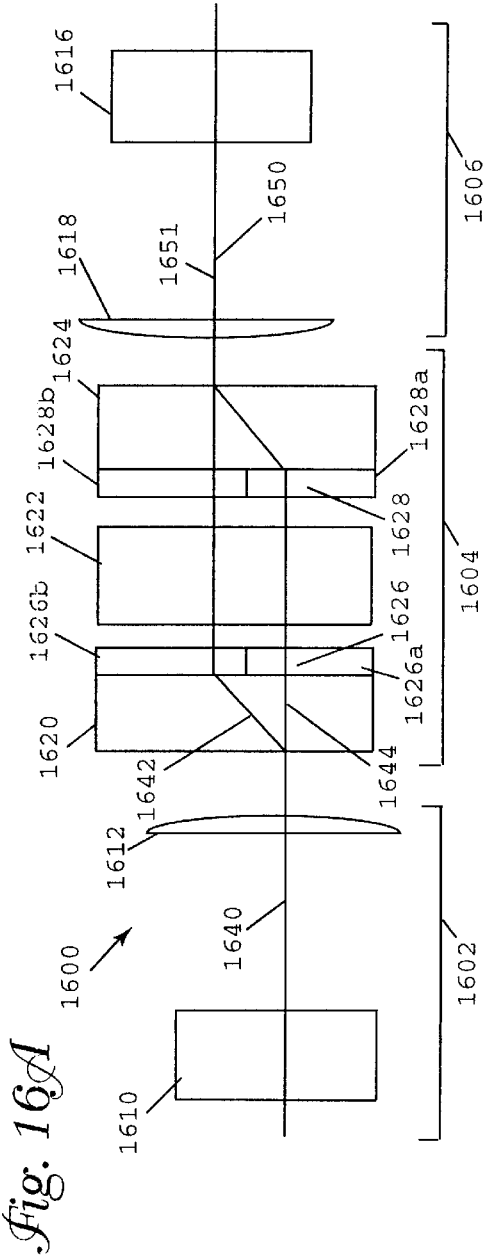
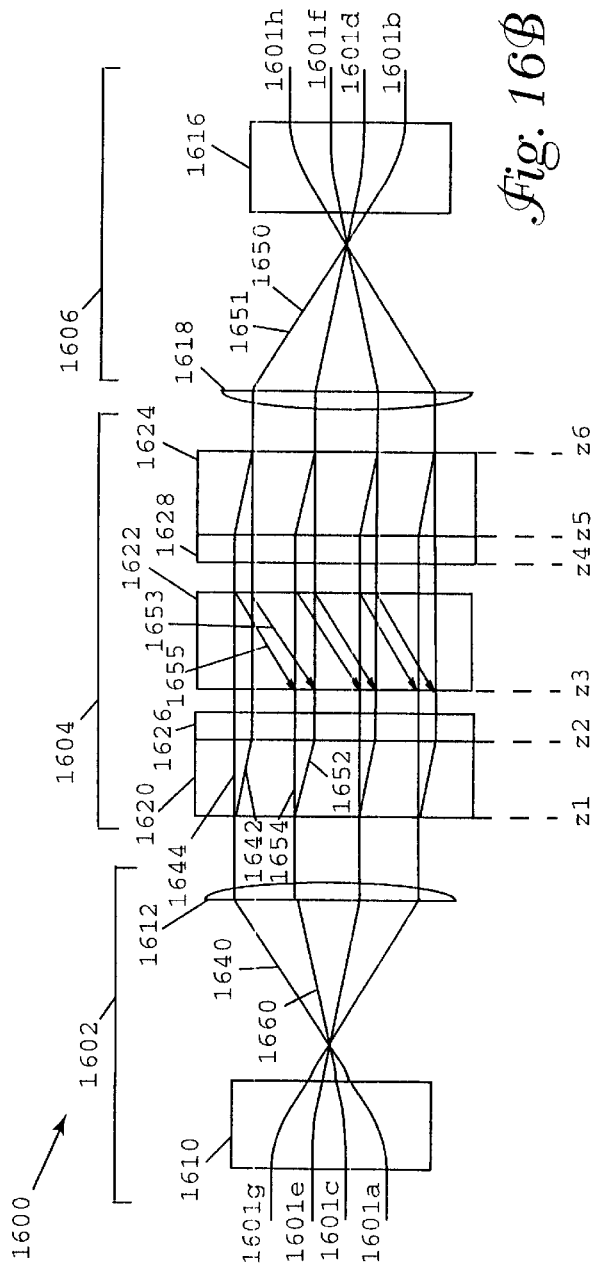

MULTIPLE PORT, FIBER OPTIC CIRCULATOR

BACKGROUND

The present invention is directed generally to a fiber optic device, and more particularly to a multiport circulator.

Non-reciprocal devices are used in microwave and optical communications for selectively directing signals from one port to another. With the growth in fiber optic communications, there is an increasing demand for non-reciprocal components that are suitable for use with fiber optic systems. For example, isolators are used for increasing the stability of the frequency and power produced by single mode semiconductor lasers by reducing the power of light feeding back into the laser. As fiber optical systems become more sophisticated, for example with the advent of wavelength division multiplexing (WDM), there is an increased need for advanced components such as optical circulators for use in, for example, multiplexing/demultiplexing, add/drop multiplexing and bidirectional transmission.

In complex fiber optic systems, there may be a multiplicity of fibers, each requiring a similar function. For example, a number of fibers may carry WDM signals that require demultiplexing. Some current demultiplexing methods require a separate demultiplexer associated with each fiber. It may be more convenient and cost-effective to provide parallel, shared capabilities, where each WDM channel signal shares some or all of the components of the demultiplexer with other WDM channels.

Present approaches to circulator design do not easily allow for scaling a circulator up for use with several channels. In addition, many circulators use a large number of components, which results in devices that are complex to align, expensive to assemble, and high in reflective loss.

In order to fit into a high density distribution frame, fiber optic components tend to be small. Moreover, in some space-limited applications, devices need input and output ports on one side. Therefore, there is also a requirement that a circulator be small so as to be compatible with the components of the rest of the fiber optic system.

Many circulator designs include the use of optical components having optical faces that are epoxied to each other. The long-term durability of the optical epoxy is uncertain, and so there is concern that such components may have a shorter mean-time-to-failure than other components that do not have epoxied faces.

Many circulators employ retardation waveplates for rotating the polarization direction of the optical beams. However, the thickness of a waveplate is accurately set for a particular wavelength, and deviation from the set wavelength compromises the polarization rotation properties of the waveplate. Therefore, the use of a waveplate in a circulator reduces the bandwidth of the isolation between ports, and constricts use of the device to a narrow wavelength range.

There exists a need to provide a circulator that has an epoxy-free optical path, is compact, and has a small number of components so that fabrication is less complex, and reflective losses are reduced. There is also a need to provide the ability to scale up the circulator to allow a larger number of inputs and outputs and also to provide the ability to operate with different channels in parallel. There is also a desire to avoid the use of retardation waveplates in the circulator, in order to obtain a wide operating wavelength range.

SUMMARY OF THE INVENTION

Generally, the present invention relates to a circulator that can be scaled up to operate with many ports, yet is compact and does not require any epoxied surfaces to be present in the beam path. The circulator possesses advantages in having a minimal number of parts, has multiple ports, is small, easy to manufacture and is simple to adjust. In some approaches, the circulator uses an inverting reflector to switch beams of different polarization from passing through a birefringent element. In some other approaches, a circulator non-reciprocal module is used in conjunction with one or two multiple-port coupling modules, to permit the circulator to operate with multiple ports.

One particular embodiment of the present invention is a circulator having a birefringent splitting and combining element configured to split a beam of light propagating in a forward direction along an input axis into first and second light paths having mutually orthogonal polarizations. The circulator also has an inverting reflector configured to reflect light travelling forward along the first light path to travel in a reverse direction along a third light path parallel to the first light path, and to reflect light travelling forward along the second light path into a reverse direction along a fourth light path parallel to the second light path. A first non-reciprocal polarization rotator is configured to rotate polarization directions of light propagating along the first, second, third and fourth light paths from the first splitting and combining element by approximately 45°. A birefringent translating unit is configured to laterally displace a light beam propagating therethrough with a first polarization direction and to transmit without lateral displacement a light beam having a second polarization direction orthogonal to the first polarization direction. Light propagating through the birefringent translating unit along one of the second and third light paths is laterally displaced and light propagating through the birefringent translating unit along the other of the second and third light paths is not laterally displaced, and light propagating along the third and fourth paths is combined into a single output path in the birefringent splitting and combining element.

In another particular embodiment, a birefringent splitting and combining element configured to split a beam of light propagating in a forward direction from a first port into first and second light paths having mutually orthogonal polarizations. An inverting reflector is configured to reflect light travelling forward along the first light path to travel in a reverse direction along a third light path parallel to the first light path, and to reflect light travelling forward along the second light path into a reverse direction along a fourth light path parallel to the second light path. A first non-reciprocal polarization rotator rotates polarization directions of light propagating along the first, second, third and fourth light paths by approximately 45°. A birefringent translation unit, positioned between the birefringent splitting and combining element and the inverting reflector, has a first birefringent translating element disposed in the second and third light paths configured to laterally displace a light beam propagating therethrough having a first polarization direction, and to transmit, without lateral displacement, a light beam propagating therethrough having a second polarization direction orthogonal to the first polarization direction. The birefringent translation unit also includes a non-birefringent element disposed in the first and fourth light paths. Light propagating along the third and fourth paths is combined into a single output path in the birefringent splitting and combining element, the single output path being coupled to a second port.

In another embodiment of a circulator, there is a means for splitting the optical beam propagating in a forward direction into two orthogonally polarized beams and for combining two beams propagating in a reverse direction into a single output beam. There is also a means for rotating polarization directions of the two beams, means for laterally displacing one of the two beams having a selected polarization direction, and means for inverting and reflecting the two beams.

Another embodiment of a circulator has a birefringent splitting and combining element configured to split a beam of light propagating in a forward direction into first and second light paths having mutually orthogonal polarizations and a non-reciprocal polarization rotator configured to rotate polarization directions of light propagating along the first and second light paths from the splitting and combining element by approximately 45°. A birefringent translating unit has upper and lower portions, the first light path passing through the lower portion and the second light path passing through the upper portion. An inverting reflector reflects light travelling forward from the lower portion to travel backward through the upper portion and to reflect light travelling forward form the upper portion backward through the lower portion; wherein one of light propagating forward and light propagating backward through the upper portion propagates through the birefringent translating unit as an extraordinary ray, and the other of the light propagating forward and the light propagating backward through the upper portion propagates through the birefringent translating unit as an ordinary ray.

Another circulator has a birefringent splitting and combining element configured to split orthogonally polarized beams of light propagating along an element input axis into first and second light paths, and a first non-reciprocal polarization rotator configured to rotate polarization directions of light propagating along the first and second light paths from the first splitting and combining element by approximately 45° in respectively opposing directions. A birefringent translating element is disposed along the first and second light paths and configured to laterally displace a light beam having a first polarization direction propagating therethrough and to transmit without lateral displacement a light beam having a second polarization direction orthogonal to the first polarization direction. A second non-reciprocal polarization rotator is configured to rotate polarization directions of light propagating along the first and second light paths from the translating element by approximately 45°. A reflector reflects light propagating along the first and second light paths in a reverse direction along the first and second light paths respectively.

Another circulator has first and second light coupling modules, each light coupling module including a first focusing element optically couplable to output ends of respective first and second pluralities of optical fibers, and having a first focusing power selected to direct light beams from the respective plurality of optical fibers to intersect a first focusing element axis, and a second focusing element spaced apart from the first focusing element by a first separation distance along the first optical axis and positioned to receive the light beams from the first focusing element, the second focusing element having a second focusing power, the first separation distance being selected to parallelize the light beams received from the first focusing element. The circulator also has a non-reciprocal module, including a first birefringent splitting and combining element configured to split an input beam of light propagating along an element input axis from the second focusing element of the first optical coupling module into orthogonally polarized first and second light paths. The non-reciprocal module also has a first non-reciprocal polarization rotator configured to rotate polarization directions of light propagating along the first and second light paths from the first splitting and combining element by approximately 45° in respectively opposing directions, and a birefringent translating element disposed along the first and second light paths and configured to laterally displace a light beam having a first polarization direction propagating therethrough and to transmit without lateral displacement a light beam having a second polarization direction orthogonal to the first polarization direction. A second non-reciprocal polarization rotator configured to rotate electric field vectors of light propagating along the first and second light paths from the translating element by approximately 45° in opposite directions. A second birefringent splitting and combining element is configured to combine light beams propagating along the first and second light paths into an output light beam directed to the second focusing element of the second optical coupling module.

Another embodiment of a circulator has a birefringent splitting and combining element configured to split a beam of light propagating in a forward direction into first and second light paths having mutually orthogonal polarizations and a first non-reciprocal polarization rotator configured to rotate polarization directions of light propagating along the first and second light paths from the first splitting and combining element by approximately 45°. A birefringent translating unit has first and second portions, the first portion disposed on the first beam path and configured to laterally displace a light beam propagating therethrough with a first polarization direction and to transmit without lateral displacement a light beam having a second polarization direction orthogonal to the first polarization direction, the second portion disposed on the second beam path and being non-birefringent. A reflecting unit is configured to reflect light propagating forward along the first path to propagate in a backwards direction through the second portion of the birefringent translation unit and to reflect light propagating forward along the second light path to propagate backwards through the first portion of the birefringent translation unit.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 2A and 2B illustrate simplified orthogonal views of the circulator of FIGS. 1A and 1B, showing a forward and a reverse beam path through the device;

FIGS. 3A and 3B illustrate polarization states of light beams at various points along different optical paths through the circulator illustrated in FIGS. 2A and 2B, for forward and reverse directions respectively;

FIGS. 4A and 4B illustrate orthogonal side views of a four port, reflective circulator according to another embodiment of the present invention;

FIGS. 5A and 5B illustrate polarization states of light beams at various points along different optical paths through the circulator illustrated in FIGS. 4A and 4B, for forward and reverse directions respectively;

FIGS. 7A and 7B illustrate polarization states of light beams at various points along different optical paths through the circulator illustrated in FIGS. 6A and 6B, for forward and reverse directions respectively;

FIG. 10A illustrates another embodiment of a two dimensional circulator according to the present invention;

FIG. 10B illustrates available ports on the circulator illustrated in FIG. 10A;

FIGS. 11A and 11B illustrate polarization states of light beams at various points along different optical paths through the circulator illustrated in FIG. 10A, for forward and reverse directions respectively;

FIGS. 13A and 13B illustrate polarization states of light beams at various points along different optical paths through the circulator illustrated in FIGS. 12A and 12B, for forward and reverse directions respectively;

FIGS. 16A and 16B illustrate schematic views of an in-line circulator having multiple ports, according to an embodiment of the present invention;

Figure 1A:
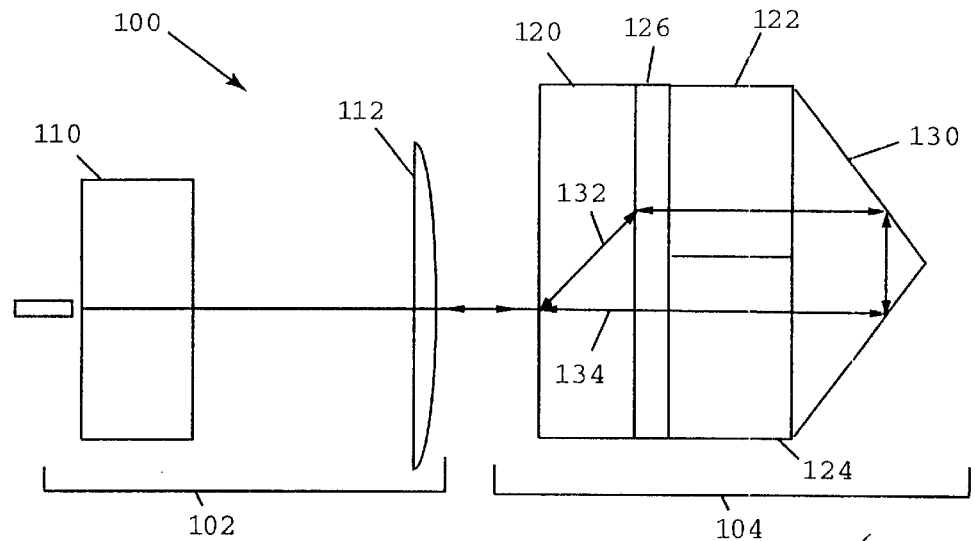
FIGS. 1A and 1B illustrate orthogonal side views of a four port, reflective circulator according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The invention is directed to circulators that are able to accommodate a wide number of inputs and outputs. The inputs may be geometrically arranged at the input to the circulator in one dimension or in two dimensions. While some presently available circulators require the use of components having epoxied surfaces in the beam path, the circulator of the present invention does not make this requirement. However, epoxied components may be used with the present invention, if desired. Additionally, the circulators permit the use of small components fewer numbers, thus permitting simplified alignment and small packaging. In particular, the circulators are configured to reduce the length and cross-section of their birefringent elements. Concurrently, the number of components in the circulators is kept low, thus simplifying fabrication and reducing production cost, and also reducing reflective losses. The circulators are of the reflective type, so that fibers couple only into one end of the device. Therefore, the circulator only requires clearance for the fibers around the input, leaving the back side of the device free for mounting on a wall or in a corner of an equipment box.

Figure 1B:
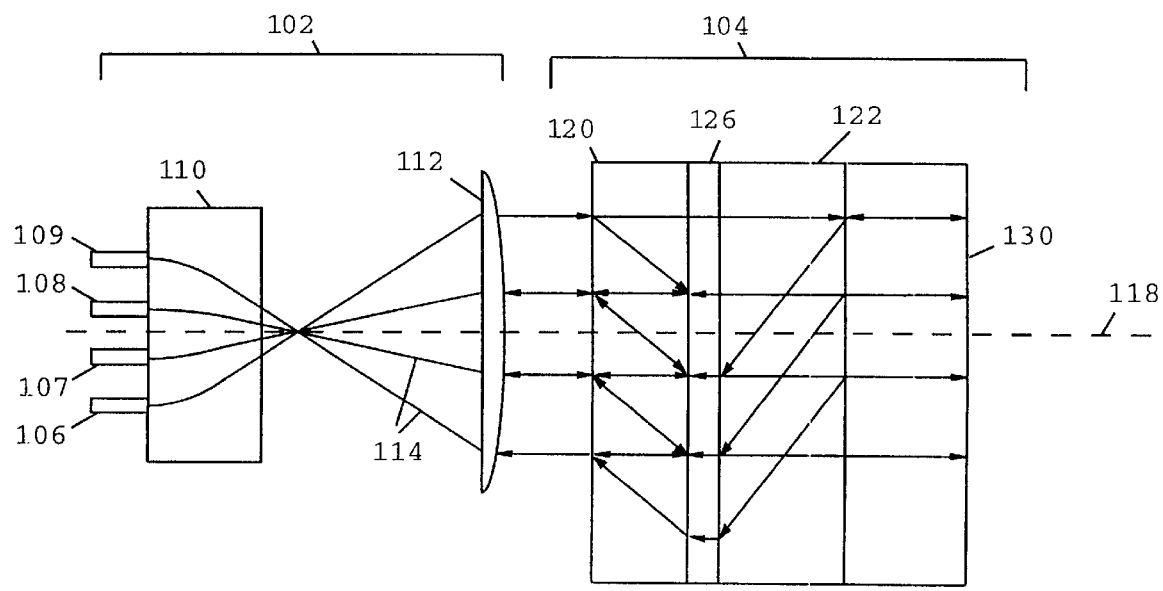

One particular embodiment of a multi-port circulator is illustrated in FIGS. 1A and 1B. The circulator 100 includes two major components, namely an optical coupling module 102 and a non-reciprocal module 104.

The optical coupling module 102 couples light from a plurality of optical fibers 106, 107, 108 and 109 into and out of the non-reciprocal module 104. In the embodiment shown, the optical coupling module 102 employs two focusing elements, a first element 110 that directs the incoming light from different fiber channels to cross the optical axis 118, and a second optical element 112 that parallelizes the beams 114 from the first optical element. The illustrated embodiment of optical coupling element 102 is further described in patent application serial number XX/XXX, XXX, entitled "Multiple Port, Fiber Optic Coupling Device", filed on Oct. 27, 1998, with attorney docket No. 2316.977US01, and incorporated herein by reference.

The use of the optical coupling module 102 is not intended to limit the invention. It will be appreciated that light may be coupled into the non-reciprocal module 104 by methods other than those illustrated in FIGS. 1A and 1B. For example each fiber may be provided with its own individual collimating lens, or a more complex arrangement of lenses may be used. However, irrespective of the configuration of the optical coupling module, the light is coupled into the non-reciprocal module in a manner that permits the non-reciprocal module to effectively operate on the light propagating therethrough.

The non-reciprocal module 104 includes two birefringent crystals 120 and 122, a non-reciprocal polarization rotator 126 positioned between the birefringent crystals 120 and 122, and an inverting reflector 130, such as a prism reflector.

Birefringent crystals manifest a well-known phenomenon referred to here as birefringent beam-splitting. When an unpolarized light beam passes into a birefringent crystal, the unpolarized beam is split into two beams, an ordinary ray and an extraordinary ray. This occurs because the refractive indices of the ordinary and extraordinary rays are different. The ordinary and extraordinary rays lie in a plane referred to here as the "walk-off plane". The walk-off plane of the second birefringent crystal 122 is oriented at approximately 45° to that of the first birefringent crystal 120.

The birefringent crystals 120 and 122 may be formed from any suitable birefringent material, such as crystalline quartz, lithium niobate, and yttrium orthovanadate ($YVO_4$). The birefringent crystal is typically transparent to the light passing therethrough. It will be appreciated that a larger birefringence results in a greater angular separation between the ordinary and extraordinary rays, thus permitting a given separation between the ordinary and extraordinary rays to be achieved in a shorter birefringent crystal. The material $YVO_4$ is particularly advantageous for this purpose, since it has a large birefringence.

The non-reciprocal polarization rotator 126 may be a Faraday rotator. A Faraday rotator is a non-reciprocal polarization rotator in that light passing through a Faraday rotator in one direction may have its polarization rotated through a certain angle in a clockwise direction, as viewed along the direction of propagation. The polarization of the light passing through the Faraday rotator in the opposite direction is rotated through the same angle in the counter-clockwise direction, as viewed along the direction of propagation. In contrast, a reciprocal polarization rotator, such as a half-wave retardation plate, rotates the polarization of light in the same sense, e.g. clockwise, irrespective of the direction of propagation through the plate.

Faraday rotators typically include a transparent material, having a high Verdet constant, that is coupled to a magnet. The magnet produces a magnetic field having a component parallel to the direction of propagation of light within the Faraday rotator. Materials with high Verdet constants include, for example, bismuth-terbium iron garnets, which are often used in Faraday rotators operating at wavelengths in the range 1.3 μm to 1.55 μm. Other materials are available for other wavelength ranges. Furthermore, other materials are available that do not require the use of an external magnet, for example bismuth-substituted rare-earth iron garnets.

The non-reciprocal polarization rotator 126 is configured to rotate the polarization of light passing therethrough by approximately 45°.

The operation of the circulator 100 is further described with reference to FIGS. 2A–2B and 3A–3B. FIGS. 2A and 2B illustrate the components of the non-reciprocal module 104, and show the path followed by one right-going beam 140 entering the non-reciprocal module 104 from the left side. The components of the non-reciprocal module 104 are illustrated separated along the optical axis of the device. The polarization states of the right-going beam 140 are illustrated in FIG. 3A. The polarization states are shown for the beam, or beams, at surfaces denoted z1, z2 . . . z5, and are presented as viewed looking along the direction of propagation of the beam 140, i.e. along the z-axis. The x and y axes illustrated in FIGS. 3A and 3B correspond to the y and x axes shown in FIGS. 2A and 2B respectively.

The position denoted "z1" represents the first face of the first birefringent crystal 120. The beam 140 entering the first birefringent crystal 120 in the forward, or +z, direction is a mixture of two orthogonal polarizations, as shown by the polarization indicator for z1.

The beam 140 is split, in a direction approximately at 45° to the y-axis and xaxis, into an upper beam 142 and a lower beam 144. The first birefringent crystal 120 is sufficiently long that the upper and lower beams 142 and 144 are separated when they exit the first birefringent crystal 120. The polarization directions of the upper and lower beams 142 and 144 are respectively at 0° and 90° to the walk-off plane. After passing out of the first birefringent crystal 120, the upper and lower beams 142 and 144 are incident on the first surface of the non-reciprocal polarization rotator 126, at z2.

In this embodiment, the non-reciprocal polarization rotator 126 rotates the polarization direction of the upper and lower beams 142 and 144 by +45°. After passing out of the polarization rotator 126, the upper and lower beams 142 and 144 are respectively incident on the second birefringent crystal 122 and a non-birefringent element 124, at plane z3.

The upper ray 142 passes through the second birefringent crystal 122 with extraordinary polarization. The lower ray 144 passes through the non-birefringent propagation element 124 a polarization direction orthogonal to that of the upper ray 142. The non-birefringent propagation element 124 may be any non-birefringent element, and such as a piece of glass, or may even be an air gap.

The upper and lower rays 142 and 144 respectively exit the second birefringent element 122 and the non-birefringent element 124 with polarization states as shown for the plane z4.

The upper and lower rays 142 and 144 then propagate through the reflecting and inverting prism 130. The lower and upper rays 142 and 144 inverted by the prism, so that the forward travelling upper and lower beams become the backward traveling lower and upper beams 154 and 152 respectively. The backward travelling beams propagate in the −z direction. FIG. 3B illustrates polarization states for the backward travelling beams 152 and 154, illustrated as if the viewer is looking along the +z direction. As can be seen in the polarization state for plane z4, prism 130 inverts the y-positions of the beams that enter the prism 130. The inversion in the y-direction occurs without any change in polarization direction.

The backward travelling upper beam 152 has an orthogonal polarization direction to that of the forward travelling upper beam 142. Therefore, upon entering the second birefringent crystal 122, the backward travelling upper beam 152 is deviated along the path 156, in the x-direction. The backward travelling lower beam 154 passes through the non-birefringent element 124. The position and polarization directions of the upper and lower backward travelling beams 152 and 154 at plane z3, after respective propagation through the second birefringent crystal 122 and non-birefringent element 124, are shown at plane z3.

The upper and lower backward travelling beams 152 and 154 propagate through the non-reciprocal polarization rotator and have their polarization directions rotated by approximately +45°, to produce the polarization state illustrated at plane z2.

The upper and lower backward traveling beams 152 and 154 then pass into the first birefringent crystal 120, where they are recombined into a single backward travelling beam 160.

A general description of the circulator 100 is that a beam travels through the circulator in the forward direction without receiving any translation within the second birefringent crystal. The beam passes through the second birefringent crystal in the forward direction with a first polarization state. On passing through the second birefringent crystal in a reverse direction, and with a polarization state orthogonal to the first polarization state, a backward travelling beam receives a lateral translation. Therefore, forward and backward beams travelling along the same path are separable.

It will be appreciated that the relative orientations of some components may be changed without affecting the operation of the circulator 100. For example, the orientation of the second birefringent crystal 122 may be such that forward-travelling beams are deviated and backward-travelling beams remain undeviated, rather than the other way around. Additionally, the non-reciprocal polarization rotator 126 may be oriented to rotate the polarization of the forward-travelling upper and lower beams 142 and 144 by approximately −45°, i.e. in a clockwise direction rather than counter-clockwise. Additionally, the second birefringent crystal 122 may be arranged to translate a beam that propagated through the first birefringent crystal 120 as ordinary ray, rather than the beam propagates as an extraordinary ray.

Referring back to FIGS. 1A and 1B, the illustrated embodiment 100 operates as a four port circulator. The light that enters the circulator 100 through fiber 106 circulates through the non-reciprocal module 104 and exits the circulator 100 through fiber 107. Likewise, the light entering the circulator 100 through fiber 107 exits the circulator 100 through fiber 108, and the light entering the circulator 100 through fiber 108 exits the circulator 100 through fiber 109. It will be appreciated that more fibers may be added to the circulator 100 to couple to light paths parallel with those shown. The limit to the number of fibers is set by practical constraints such as crystal size, optical quality of the components, and maximum allowable package size. In summary, a compact, multiport circulator is possible using a small number of components, none of which have epoxied faces in the beam path, and which avoids the use of waveplates.

Figure 14A:
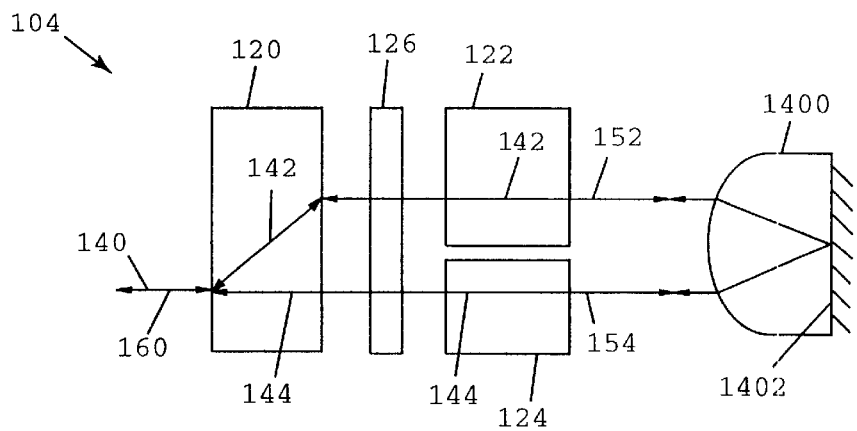
FIGS. 14A–14C illustrate reflective multiport circulators with different types of inverting reflectors.
Figure 14B:
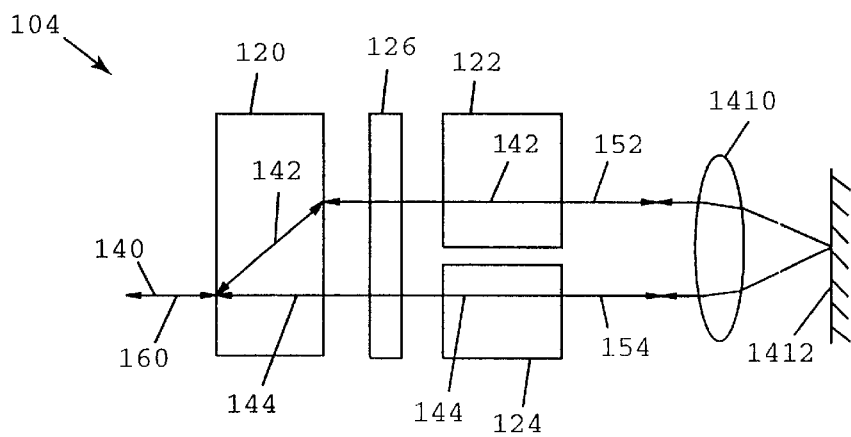
Figure 14C:
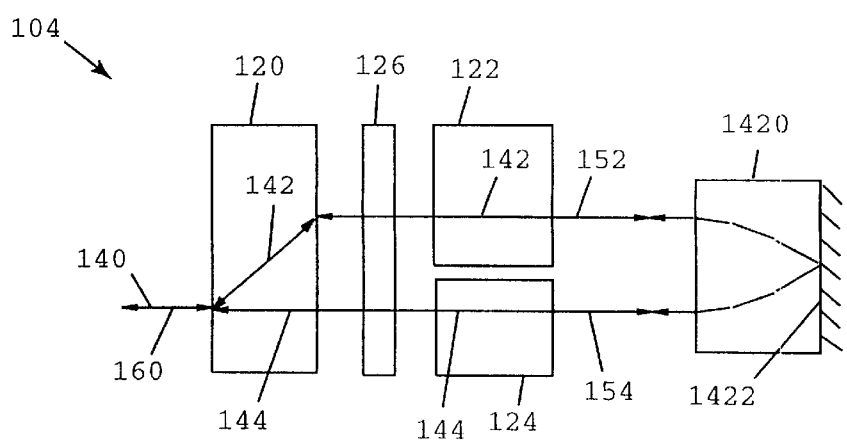

Related embodiments are illustrated in FIGS. 14A–14C, which have different types of inverting reflectors. Similar elements are shown with similar identification numbers. In FIG. 14A, the forward travelling beams upper and lower beams 142 and 144 enter a lens 1400 that has a reflecting surface 1402. The lens 1400 may be cylindrical or have an aspherical shape. The lens 1400 focuses in one dimension only, the dimension shown to be lying in the plane of the figure. The backward travelling beams 152 and 154 pass out from the lens 1400 along directions antiparallel to the directions of the forward travelling beams 142 and 144.

In FIG. 14B, the forward travelling beams upper and lower beams 142 and 144 pass through a lens 1410 and reflect off a reflecting surface 1412, such as a mirror. The lens 1400 may be cylindrical in shape, or have some other profile suitable for focusing the light in one dimension. The backward travelling beams 152 and 154 resulting from reflection off the reflecting surface 1412 pass back through the lens 1410 and propagate along directions antiparallel to the directions of the forward travelling beams 142 and 144.

In FIG. 14C, the forward travelling beams upper and lower beams 142 and 144 enter a graded index (GRIN) lens 1420 that focuses in one dimension and has a reflecting surface 1422. The GRIN lens 1420 has a length that is one quarter pitch, so that the entering beams intersect at the reflecting surface. The GRIN lens may have a cylindrical index profile, or other suitable index profile. The backward travelling beams 152 and 154 pass out from the lens 1400 along directions antiparallel to the directions of the forward travelling beams 142 and 144.

Another embodiment of a non-reciprocal module 404 for a multiple port circulator is illustrated in FIGS. 4A and 4B. In this embodiment, light from a number of fibers may be introduced to the non-reciprocal module 404 by a coupling module similar to the coupling module 102 described above, although this is not a necessary limitation of the invention.

The non-reciprocal module 404 includes a first birefringent crystal 420, non-reciprocal polarization rotators 426 and 428, a second birefringent crystal 422 and an inverting reflecting prism 430. The polarization states of light passing through the module 402 are illustrated in FIGS. 5A and 5B.

The position denoted "z1" represents the first face of the first birefringent crystal 420. The beam 440 entering the first birefringent crystal 420 in the forward direction is a mixture of two orthogonal polarizations, as shown by the polarization indicator for z1.

The entering beam 440 is split, in a direction approximately at 45° to the y-axis and x-axis, into an upper beam 442 and a lower beam 444. The first birefringent crystal 420 is sufficiently long that the upper and lower beams 442 and 444 are separated when they exit the first birefringent crystal 420. The polarization directions of the upper and lower beams 442 and 444 are respectively at 0° and 90° to the walk-off plane. After passing out from the first birefringent crystal 420, the upper and lower beams 442 and 444 are incident on the first surface of the first non-reciprocal polarization rotator 426, as illustrated at z2.

In this embodiment, the non-reciprocal polarization rotator 426 includes two Faraday rotators 427 and 429. The upper Faraday rotator 427 is configured to rotate polarization of the upper beam 442 by +45° and the lower Faraday rotator 429 is configured to rotate the polarization of the lower beam 444 by −45°. After passing out of the first non-reciprocal polarization rotator 426, the upper and lower beams 442 and 444 are respectively incident on the second birefringent crystal 422 and a non-birefringent propagation element 424, at plane z3. The polarization directions of the upper and lower beams 442 and 444 are parallel.

The upper ray 442 passes through the second birefringent crystal 422 with extraordinary polarization. The lower ray 444 passes through the non-birefringent propagation element 424 with a polarization direction parallel to that of the upper ray 442. The non-birefringent propagation element 424 may be any non-birefringent element, and such as a piece of glass, or may even be an air gap.

The upper and lower rays 442 and 444 respectively exit the second birefringent element 422 and the non-birefringent element 424 with parallel polarization states as shown for the plane z4.

The upper and lower rays 442 and 444 then propagate through a second non-reciprocal polarization rotator 428, such as a Faraday rotator, that rotates the polarization of the upper and lower beams 442 and 444 by +45°.

The upper and lower rays 442 and 444 then propagate through the reflecting and inverting prism 430. The lower and upper rays 442 and 444 inverted by the prism, so that the forward travelling upper and lower beams 442 and 444 become the backward traveling lower and upper beams 454 and 452 respectively. The backward travelling beams 452 and 454 propagate in the −z direction. FIG. 5B illustrates polarization states for the backward travelling beams 452 and 454, illustrated as if the viewer is looking along the +ve z direction. As can be seen in the polarization state for plane z5, the prism 430 inverts the y-positions of the beams that enter the prism 430. The inversion in the y-direction occurs without any change in polarization direction.

After reflection by the prism 430, the upper and lower beams 452 and 454 pass back through the second non-reciprocal polarization rotator 428, where the polarization directions are once again rotated by +45°, as shown by the polarization states for position z4.

The backward travelling upper beam 452 has a polarization direction that is orthogonal to that of the forward travelling upper beam 442. Therefore, upon entering the second birefringent crystal 422, the backward travelling upper beam 452 is deviated along the path 456, in the x-direction. The backward travelling lower beam 454 passes through the non-birefringent element 424. The position and polarization directions of the upper and lower backward travelling beams 452 and 454, after respective propagation through the second birefringent crystal 422 and non-birefringent element 424, are shown at plane z3.

The upper and lower backward travelling beams 452 and 454 propagate through the first non-reciprocal polarization rotator 426 and have their polarization directions rotated by approximately 45° in opposing directions, to produce the polarization states illustrated at plane z2.

The upper and lower backward traveling beams 452 and 454 then pass into the first birefringent crystal 420, where they are recombined into a single backward travelling output beam 460.

It will be appreciated that the non-reciprocal module 404 may also be used in a multiple port circulator in a manner similar to that shown in FIG. 1B for the non-reciprocal module 104.

Figure 6A:
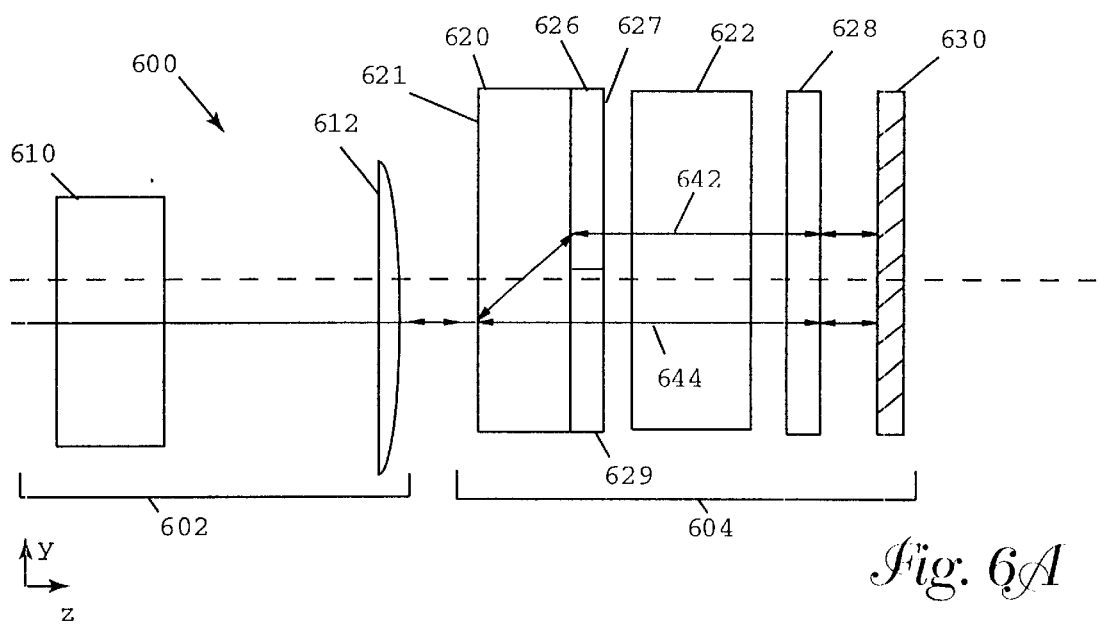
FIGS. 6A and 6B illustrate orthogonal side views of a four port, reflective circulator according to another embodiment of the present invention.
Figure 6B:
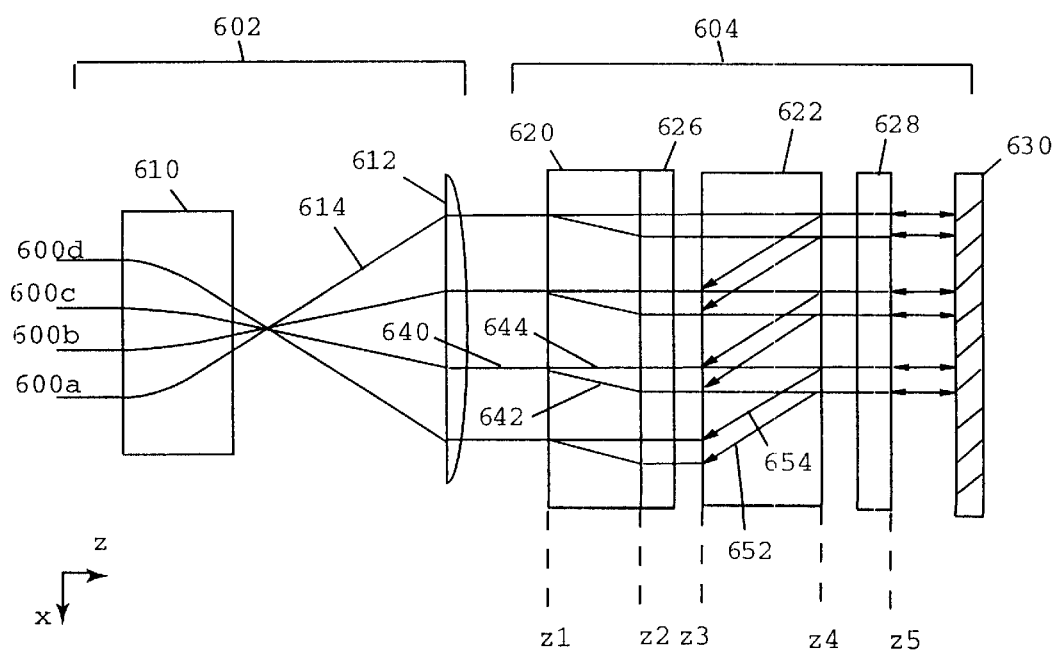

Another embodiment of a reflective circulator 600 is illustrated in FIGS. 6A and 6B, and polarization states are presented for the different beams passing through the non-reciprocal module in forward and backward directions in FIGS. 7A and 7B respectively. The circulator 600 includes a coupling module 602 and a non-reciprocal module 604. The coupling module 602 is illustrated as the multiple port coupling module described in patent application serial number XX/XXX,XXX, entitled "Multiple Port, Fiber Optic Coupling Device", filed on Oct. 27, 1998, with attorney docket No. 2316.977US01. It will be appreciated that the inclusion of such a coupling module is not intended to be a limitation of the invention, and that other methods of coupling into the non-reciprocal module 604 may be used, for example where individual fibers are coupled to the non-reciprocal module using individual lenses.

The beams 614 passing into the non-reciprocal module 604 enter a first birefringent crystal 620, where each beam is split into two beams of orthogonal polarization, for example the ordinary and extraordinary rays. We consider in particular the beam 640 which is split into two orthogonally polarized beams 642 and 644, as illustrated for plane z1 in FIG. 7A The upper and lower beams 642 and 644 then pass through the first non-reciprocal rotator 626, where their polarization directions are rotated through approximately 45° in opposing directions, so that the beams 642 and 644 have parallel polarization states as illustrated for plane z3. The non-reciprocal polarization rotator 626 may be formed from two Faraday rotators, a lower rotator 629 oriented to rotate polarization of the lower beam 644 by −45° and the upper rotator 627 oriented to rotate the upper beam 642 by +45°.

The upper and lower beams 642 and 644 pass into a second birefringent element 622 whose optical axis is rotated by approximately 45° relative to the optical axis of the first birefringent element. The second birefringent element 622 is crystallographically oriented so that light in the upper and lower beams 642 and 644 is not deviated as it passes through, as shown by the polarization indicators for plane z4. The upper and lower beams 642 and 644 then pass through a second non-reciprocal polarization rotator 628, which may be a single Faraday rotator. The second non-reciprocal polarization rotator rotates the polarization direction of the upper and lower beams 642 and 644 by approximately 45°, as shown for plane z5.

After passing through the second non-reciprocal polarization rotator 628, the upper and lower beams 642 and 644 are reflected by a reflector 630 into a direction opposite the incident direction. The reflector 630 may be a separate reflecting surface, as illustrated, or may be a reflecting surface on the back side of the second non-reciprocal polarization rotator 628, for example a reflective coating on a Faraday rotator. The reflector 630 may be a multi-layered dielectric mirror.

The backward-going upper and lower beams 642 and 644 pass back through the second non-reciprocal polarization rotator 628 and have their polarization directions rotated by a further 45°, so that they enter the second birefringent crystal 622 with a polarization state that is orthogonal to the polarization state for the forward travelling beams through the second birefringent crystal 622. The second birefringent crystal 622 is oriented so that the beams 642 and 644 are deviated along paths 652 and 654 respectively and exit the second birefringent crystal 622 with a transverse displacement relative to the position of entry into the second birefringent crystal 622, as illustrated in the polarization indicator for the plane z3.

The backward travelling upper and lower beams 652 and 654 pass through the first non-reciprocal polarization rotator 626, where the upper and lower beams 652 and 654 are rotated by approximately 450 in opposite directions, as illustrated for plane z2, so that their polarizations are orthogonal.

The orthogonally polarized beams 652 and 654 then pass into the first birefringent crystal 620 where they are combined at the input face 621 to produce a single output beam 660, as illustrated at plane z1.

Accordingly, light that enters the circulator 600 along path exits from the circulator along another path. Thus, light entering the circulator 600 along path 600a exits the circulator 600 along path 600b. Likewise, the light entering along path 600b exits along path 600c, and the light entering along path 600c exits along path 600d. Therefore, the embodiment 600 illustrated is a four port circulator.

The number of parallel paths through the reflective circulator 600 is not limited to the number illustrated, but may be increased or decreased, depending on the engineering requirements, and practical constraints such as maximum overall size, available birefringent crystals and optical quality of the components. For example, given sufficient crystal size, more parallel paths may be added.

Figure 15A:
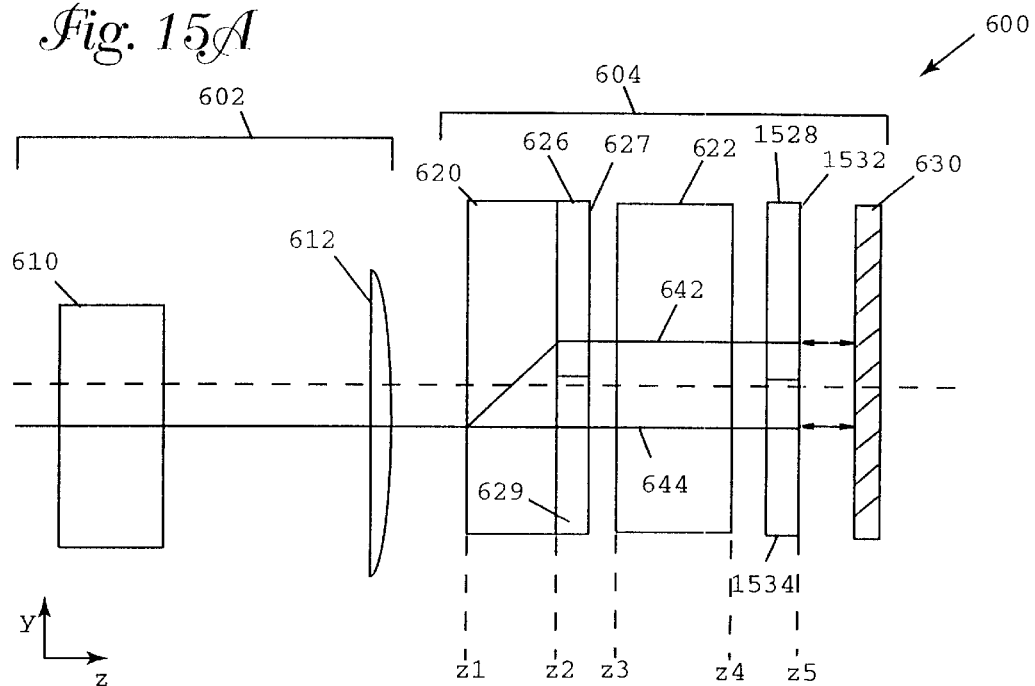
FIG. 15A illustrates a reflective circulator according to an embodiment of the invention.
Figure 15B:
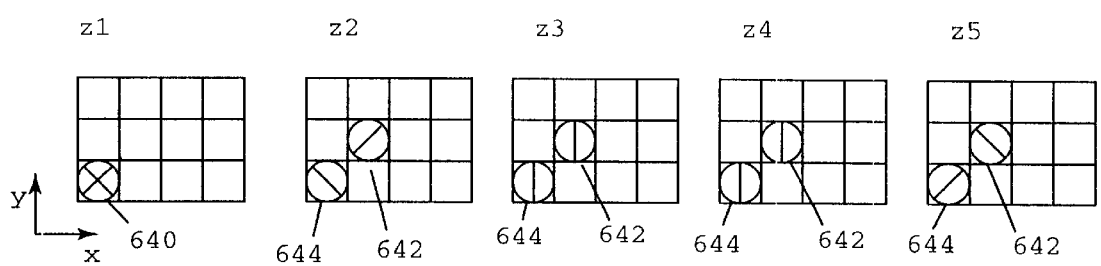
FIGS. 15B and 15C illustrate polarization states for light beams at various points along different optical paths through the circulator illustrated in FIG. 15A, for forward and reverse directions respectively.
Figure 15C:
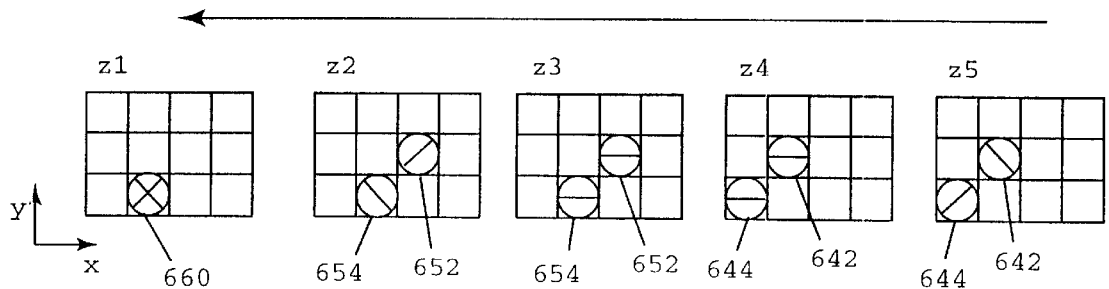

Another embodiment, similar to that shown in FIG. 6A, is illustrated in FIG. 15A. Similar elements in FIGS. 6A and 15A have similar numbers. In the embodiment illustrated in FIG. 15A, the second non-reciprocal polarization rotator 1528 includes two Faraday rotators 1532 and 1534. The upper Faraday rotator 1532 is oriented to rotate the polarization of light passing therethrough in a counter-clockwise direction, as can be seen in the polarization state diagrams shown in FIGS. 15B and 15C. In particular, the polarization of the upper beam 642 is rotated in a counter-clockwise direction when passing through the upper Faraday rotator 1532 in the +z direction, i.e. in passing from plane z4 to plane z5 in FIG. 15B. The polarization of the lower beam 644 is rotated in a clockwise direction when passing through the lower Faraday rotator 1534 in the +z direction, i.e. in passing from plane z4 to plane z5 in FIG. 15B. After reflection from the reflecting surface 630, the polarization of the upper beam 642 is rotated in a counter-clockwise direction when passing through the upper Faraday rotator 1532 in the −z direction, i.e. in passing from plane z5 to plane z4 in FIG. 15C. The polarization of the lower beam 644 is rotated in a clockwise direction when passing through the lower Faraday rotator 1534 in the −z direction, i.e. in passing from plane z5 to plane z4 in FIG. 15C.

Figure 8A:
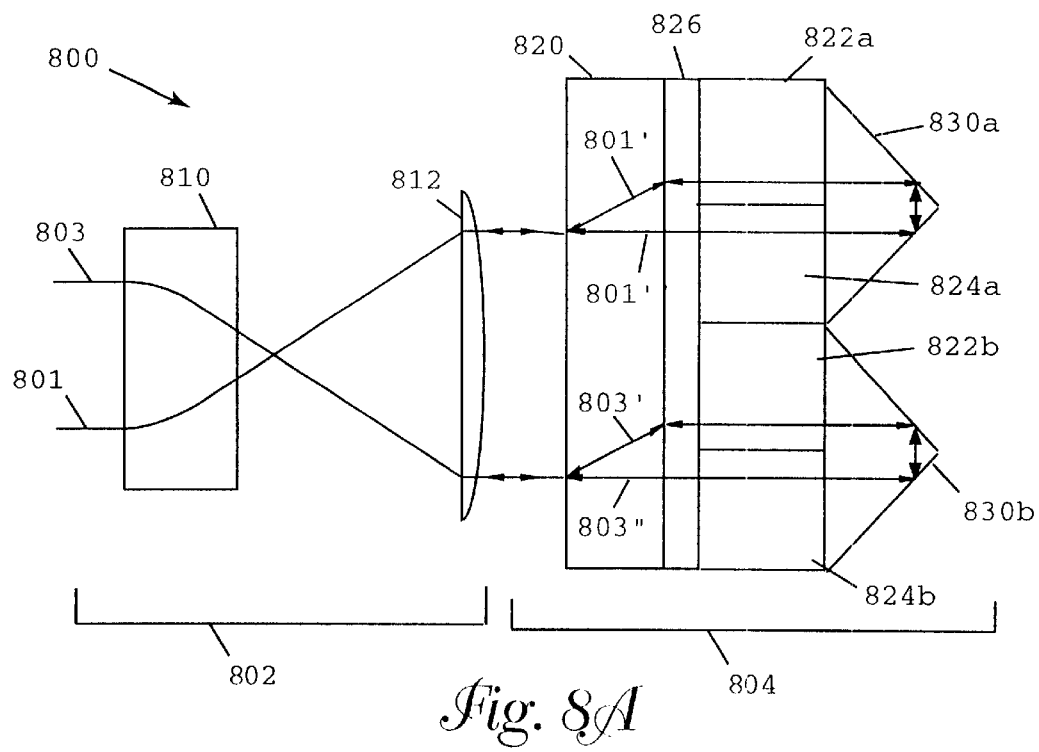
FIGS. 8A and 8B illustrate orthogonal side views of a two dimensional circulator according to an embodiment of the present invention.
Figure 8B:
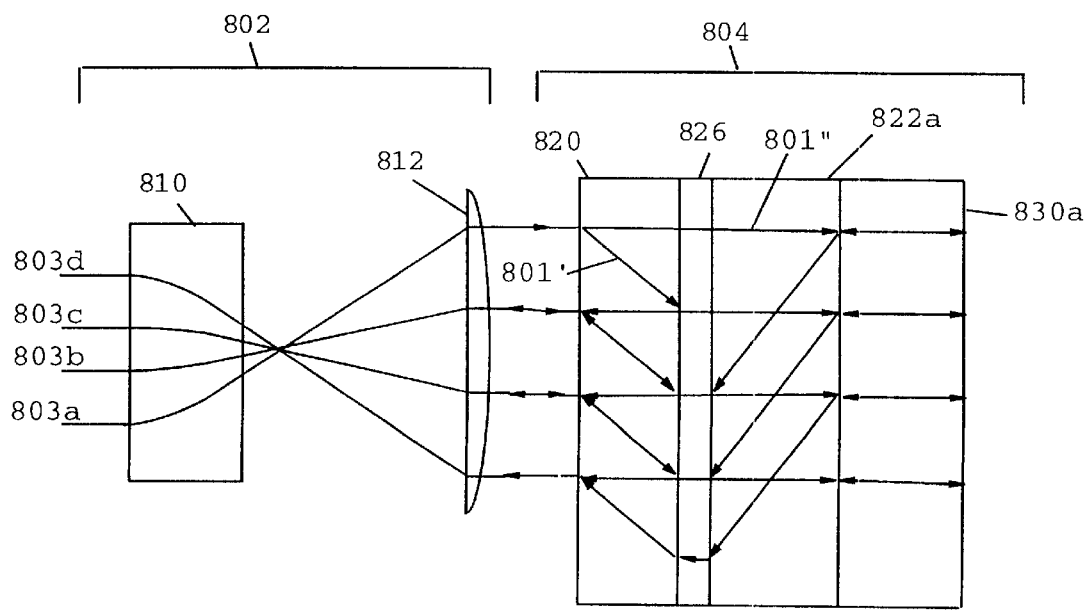

FIGS. 8A and 8B illustrate orthogonal views of a two dimensional reflective multiport circulator 800. The two dimensional circulator 800 includes two parallel sets of paths 801 and 803, each of which operates individually and separately in a manner like that illustrated above for the reflective circulator 100. The two dimensional circulator 800 has a first coupling module 802 and a non-reciprocal module

804. The coupling module 802 is used for coupling light from respective sets of fibers into and out of the non-reciprocal module 804. Coupling modules of the type discussed in patent application serial number , entitled "Multiple Port, Fiber Optic Coupling Device", filed on Oct. 27, 1998, are well suited for coupling light from a two dimensional array of fibers into the non-reciprocal module 804, although other methods may also be used.

The non-reciprocal module 804 includes a first birefringent crystal 820 for splitting and combining the beams 801 and 803 into 801' and 801"; and 803' and 803" respectively. The non-reciprocal module 804 also includes a non-reciprocal polarization rotator 826 and second birefringent crystals 822a and 822b respectively positioned along the beam paths for beams 801' and 803' for providing translation in a manner like that described above for birefringent crystal 122. Non-birefringent elements 824a and 824b are positioned along beams 801" and 803" in a manner similar to that for non-birefringent element 124.

Each beam path 801 and 803 has an associated inverting reflector 830a and 830b respectively, to invert the position of related beams in the y-direction, like the prism 130.

Figure 9A:
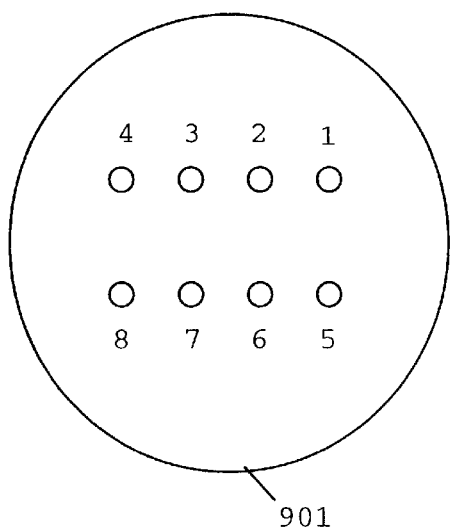
FIGS. 9A and 9B illustrate a schematic end view of a two dimensional reflective circulator and a schematic of an eight-port device.

The two dimensional circulator 800 may be viewed as two four port circulators stacked in a parallel configuration, where each four port circulator is like the reflective circulator 100. The parallel four port circulators may share coupling optics, as illustrated, rather than having separate coupling modules. Accordingly, the ports may arranged on the end 901 of the two-dimensional circulator as shown in FIG. 9A, having two rows of ports with four ports in each row. Therefore, the input ports are arranged in a 4×2 matrix. In the upper row, corresponding to beams 803, port 1 has a beam path coupled to port 2, port 2 has a beam path coupled to port 3 and port 3 has a beam path coupled to port 4. In the lower row, corresponding to the beams 801, port 5 has a beam path coupled to port 6, port 6 has a beam path coupled to port 7, and port 7 has a beam path coupled to port 8. The ports in the lower row, i.e. ports 5–8, do not have to be aligned with the ports of the upper row, i.e. ports 1–4.

Figure 9B:
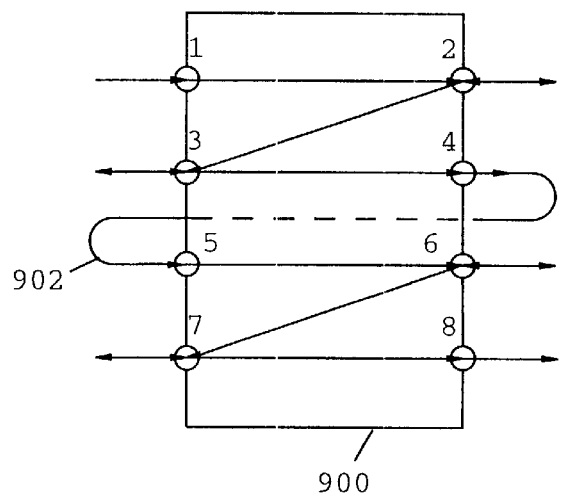

The different rows of the circulator may be connected, for example by a coupling, such as an optical fiber, between ports 4 and 5, which results in a six port circulator. This is illustrated in FIG. 9B, where the circulator is shown as a device 900 having eight ports, numbered 1–8. Odd-numbered ports are internally coupled to the next highest even-numbered port, for example ports 1, 3, and 7 are respectively coupled to ports 2, 4, and 8. Likewise, even numbered ports, with the exception of ports 4 and 8 at the end of their respective rows, are internally coupled to the next highest odd-numbered port, for example ports 2 and 6 are respectively coupled to ports 3 and 7.

Port 4 may be externally coupled, for example using an external fiber link 902, to port 5, so that the two rows are linked together. In consequence, the device 900 operates as a 6 port circulator, i.e. light goes from port 1 to port 2, port 2 to port 3, port 3 to port 6 (via ports 4 and 5), port 6 to port 7, and from port 7 to port 8.

It will be appreciated that not all ports of a multiport circulator need be used. For example, a 4×2 port in line circulator may be used to provide two independent three-port circulators, for example using ports 1, 2 and 3 for the first three-port circulator and ports 6, 7 and 8 for the second three-port circulator. The different ports of a multiport circulator may be configured in many different ways.

Furthermore, a two-dimensional circulator is not limited to being having a 4×2 port matrix. For example, in going from the one-dimensional circulator 100 of FIGS. 1A and 1B to the two dimensional circulator 800 of FIGS. 8A and 8B, one set of non-reciprocal module elements was essentially stacked upon another set. This stacking process may be repeated m times to produce m+1 rows of ports stacked in the y-direction. Furthermore, additional ports may be added in the x-direction. Thus, a two-dimensional circulator may have N×M ports, where N and M are reasonable numbers limited by such factors as engineering design and size of the device. The other embodiments of reflective circulator discussed herein may also be adapted for operation in two-dimensional arrays.

Another two dimensional circulator is illustrated in FIG. 10A. The circulator 1000 includes a coupling module 1002, with two lenses 1010 and 1012, and a non-reciprocal module 1004. The non-reciprocal module has a first birefringent crystal 1020, a non-reciprocal polarization rotator 1026, second and third birefringent crystals 1022 and 1024 and a reflecting and inverting prism 1030.

The operation of the circulator 1000 is described with reference to FIGS. 11A and 11B. The planes z1–z8 marked with dashed lines correspond to the planes illustrating the polarization states of the corresponding light beams. All polarization states are as viewed from the left side of the circulator, in the +z direction. FIG. 11A illustrates the polarization states for light passing through the circulator in the forward direction, from fiber 1008 to fiber 1009. FIG. 11B illustrates the polarization states of light passing through the circulator in the reverse direction from fiber 1009.

The beam 1040 from the coupling module 1002, illustrated at plane z1, is split in the first birefringent crystal 1020 into upper and lower beams 1042 and 1044, as illustrated at plane z2. The polarization directions of the upper and lower beams 1042 and 1044 are rotated by approximately 45° in an counter-clockwise direction by the non-reciprocal polarization rotator 1026, which may be a Faraday rotator. The polarization states of the upper and lower beams 1042 and 1044 after passing through the non-reciprocal polarization rotator 1026 are shown for plane z3. The non-reciprocal polarization rotator 1026 may alternatively be aligned to rotate the polarization of the upper and lower beams by 45° in a clockwise direction.

Light in the upper beam 1042 passes through a second birefringent crystal 1022 that is aligned to transversely displace light, having a selected polarization state, in a direction out of the plane of the figure, while permitting light of the orthogonal polarization state to pass through without being displaced. The light in the upper beam 1042 has a polarization direction that results in no transverse displacement on passing through the second birefringent crystal 1022 in the forward direction. Additionally, the lower beam 1044 passes through a non-birefringent section 1023. The non-birefringent section 1023 may be, for example, a piece of glass, an air gap, or some other suitable material that has no polarization-dependent effect on the lower beam 1044. Therefore, the polarization states of the upper and lower beams 1042 and 1044 are unchanged on passing from plane z3 to plane z4.

The upper and lower beams 1042 and 1044 pass into the reflecting prism 1030, where they are inverted, to produce respective lower and upper backward-travelling beams 1054 and 1052. On exiting from the prism 1030, the upper and lower beams 1052 and 1054 have the polarization states as illustrated for plane z5.

The upper beam 1052 passes through a third birefringent crystal 1024 that is oriented to transversely displace a light beam, having a selected polarization state, in a direction out of the plane of the figure, while permitting light of the orthogonal polarization state to pass through without being displaced. The light in the upper beam 1052 has a polarization direction that results in a transverse displacement occurring on passage through the third birefringent crystal 1024 in the −z direction. The result of this transverse displacement is seen in the polarization state diagram for plane z6. Furthermore, the lower beam 1054 passes through a non-birefringent section 1025. The non-birefringent section 1025 may be, for example, a piece of glass, an air gap, or some other suitable material that has no polarization-dependent effect on the lower beam 1054.

The upper and lower beams 1052 and 1054 then pass through the non-reciprocal polarization rotator 1026 in the reverse direction, where the polarization direction for each beam 1052 and 1054 is again rotated by approximately 45° in the counter-clockwise direction. The polarization states of the upper and lower beams 1052 and 1054 after propagating through the non-reciprocal polarization rotator are illustrated for plane z7.

The upper and lower beams 1052 and 1054 then pass back into the first birefringent crystal 1020, where they are combined to produce a single output beam 1060, as illustrated for plane z8. The output beam 1060 is coupled to fiber 1009. Therefore, light that enters the circulator 1000 from fiber 1008 is coupled to fiber 1009.

Now we consider light travelling back through the circulator 1000 from fiber 1009, in the +z direction, along the path labeled 1080, which is coincident, and counter-parallel to path 1060. The polarization states of light beams passing backwards through the circulator 1000 from fiber 1009 are illustrated in FIG. 1B. The beam 1080 is typically of mixed polarization, as illustrated for plane z8. On entering the first birefringent crystal 1020, the beam 1080 is split into upper and lower beams 1082 and 1084 having orthogonal polarization, as illustrated for plane z7.

The upper and lower beams 1082 and 1084 propagate through the non-reciprocal polarization rotator 1026, where the polarization direction of each beam 1082 and 1084 is rotated in an counter-clockwise direction by about 45°, as illustrated for the plane z6. The upper beam 1082 passes through the third birefringent crystal 1024 with a polarization state that results in no transverse displacement, while the lower beam 1084 passes through the non-birefringent section 1025. Therefore, the polarization states of the beams 1082 and 1084 at plane z5 are the same as those at plane z6.

The upper and lower beams 1082 and 1084 pass into the reflecting prism 1030, where they are inverted, to produce respective lower and upper beams 1094 and 1092 propagating in the −z direction. On exiting from the prism 1030, the upper and lower beams 1092 and 1094 have the polarization states as illustrated for plane z4.

The upper beam 1092 passing through the second birefringent crystal 1022 in the −z direction has a polarization state orthogonal to that of the upper beam 1042 that passes through the second birefringent crystal 1022 in the +z direction. The upper beam 1092 has a polarization direction that results in a transverse displacement in the +x direction that occurs on passage through the second birefringent crystal 1022 in the −z direction. The result of this transverse displacement is seen in the polarization state diagram for plane z3. The lower beam 1094 passes through the non-birefringent section 1023 unchanged.

On passing through the non-reciprocal polarization rotator 1026, the polarization directions of the upper and lower beams 1092 and 1094 are rotated in an counterclockwise direction by about 45°, resulting in the polarization states illustrated for the plane z2.

The upper and lower beams 1092 and 1094 then pass into the first birefringent crystal 1020, where they are combined into a single output beam 1095, as shown for plane z1. The output beam 1095 is directed through the coupling module 1002 to a third port, typically another fiber (not shown).

A schematic of the input face 1096 to the circulator 1000 is illustrated in FIG. 10B. A number of ports, p1–p11, are illustrated, in two rows. The upper row has ports p1, p3, p5, p7, p9 and p11. The lower row has ports p2, p4, p6, p8, and p10. Light that enters the circulator through port p1, for example fiber 1008, is directed to port p2, for example fiber 1009, in the manner just described with regard to FIGS. 10A and 11A. Likewise, light from p2 is directed to port p3, in the manner described with regard to FIGS. 10A and 11B. It will be appreciated that the circulator 1000 described allows operation with multiple ports, so that light propagating from port p3 is directed to port p4, and light propagating from port p4 is directed to port p5, and so on. In the particular embodiment illustrated in FIG. 10B, light propagating from port p11 is directed to port p11. Thus, the circulator 1000 operates as a multiport circulator having ports p1–p11 arranged in a two-dimensional pattern. It will be appreciated that the circulator 1000 may be provided with more, or fewer ports than shown.

Figure 12:
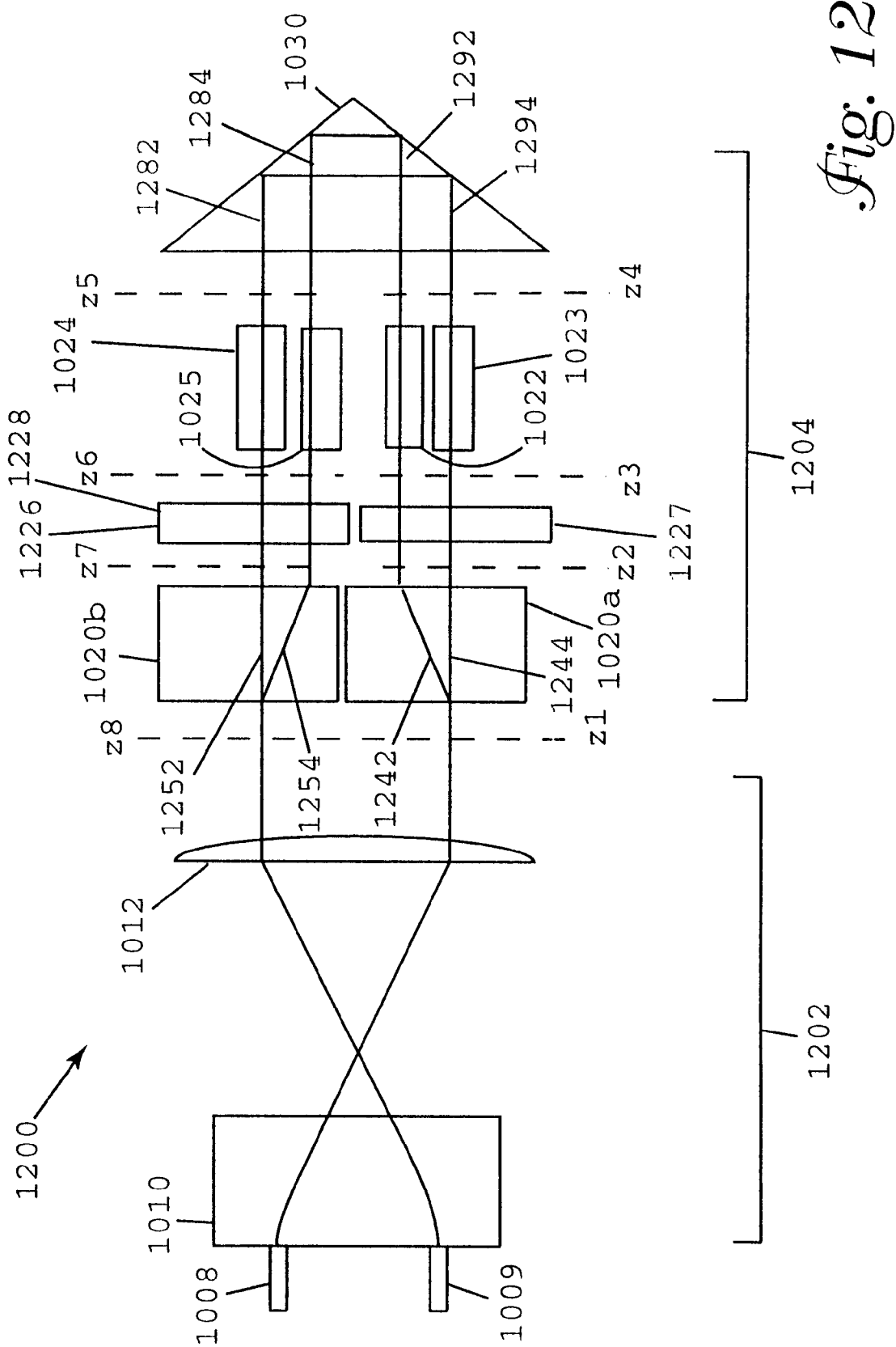
FIG. 12 illustrates a schematic view of a circulator having multiple ports arranged in two dimensions.

FIG. 12 illustrates another embodiment of a circulator 1200, that is similar to that illustrated in FIG. 10A. Like elements are shown with the same label number. One of the differences between circulators 1000 and 1200 is that circulator 1200 has two birefringent crystals 1020*a* and 1020*b* oriented relative to each other so that the lower beam 1254 is deviated in the upper birefringent crystal 1020*b*, while the upper beam 1242 is deviated in the lower birefringent crystal 1020*a*. This is unlike the circulator 1000 where both upper beams 1042 and 1052 are deviated in the first birefringent crystal 1020. Also, the non-reciprocal polarization rotator 1226 in the circulator 1200 includes two Faraday rotators 1227 and 1228 oriented to rotate polarization in different directions. For example, the lower Faraday rotator 1227 may be oriented to rotate polarization by approximately 45° in the counter-clockwise direction, whereas the upper faraday rotator 1228 may be oriented to rotate polarization by approximately 45° in the clockwise direction. The polarization states of the beams propagating through the circulator are similar to those for the beams 1042, 1044, 1052, 1054. 1082, 1084, 1092 and 1094 discussed above with regard to FIGS. 10A, 11A and 11B, with the exception of the polarization and position of the beams passing through planes z7 and z8. FIGS. 13A and 13B show polarization and positions of the +z propagating beams 1242 and 1244, the −z propagating beams 1252 and 1254, the +z propagating beams 1282 and 1284, and −z propagating beams 1292 and 1294 relative to the planes z1 to z8.

Another particular embodiment of a multi-port circulator is illustrated in FIGS. 16A and 16B. The circulator 1600 includes three major components, namely two optical coupling modules 1602 and 1606, and a non-reciprocal module 1604.

The optical coupling modules 1602 and 1604 couple light from a plurality of optical fibers. The first optical coupling module 1602 is coupled to fibers 1601*a*, 1601*c*, 1601*e* and 1601*g*. The second optical coupling module is coupled to fibers 1601*b*, 1601*d*, 1601*f* and 1601*h*. The circulator 1600 has an in-line arrangement, so that light entering from one side, say along fiber 1601a, leaves the circulator 1600 at the other side, along fiber 1601b. Likewise, light entering the circulator 1600 along fiber 1601b leaves the circulator 1600 along fiber 1601c. In the embodiment shown, the optical coupling module 1602 employs two focusing elements, a first element 1610 that directs the incoming light from different fiber channels to cross an optical axis (not shown), and a second optical element 1612 that parallelizes the beams from the first optical element 1610. Likewise, the second optical coupling module 1606 has a first focusing element 1616 and a second focusing element 1618 that operate in a manner similar to those in the first coupling module 1602. The illustrated embodiments of optical coupling modules 1602 and 1606 are further described in patent application serial number XX/XXX,XXX, entitled "Multiple Port, Fiber Optic Coupling Device", filed on Oct. 27, 1998, with attorney docket No. 2316.977US01.

The non-reciprocal module 1604 includes three birefringent crystals 1620, 1622 and 1624. A first non-reciprocal polarization rotator 1626 is positioned between the first and second birefringent crystals 1620 and 1622, and a second non-reciprocal polarization rotator 1628 is positioned between the second and third birefringent crystals 1622 and 1624.

The first and third birefringent crystals 1620 and 1624 are oriented for birefringent beam splitting and combining of the light beams from the optical fibers 1601a–1601g. The walk-off planes in the first and third birefringent crystals 1620 and 1624 are arranged to be approximately parallel. The walk-off plane of the second birefringent crystal 1622 is oriented at approximately 45° to that of the first birefringent crystal 1620.

The first non-reciprocal polarization rotator 1626 may include two Faraday rotators 1626a and 1626b. Likewise, the second non-reciprocal polarization rotator 1628 may include two Faraday rotators 1628a and 1628b.

Figure 17A:
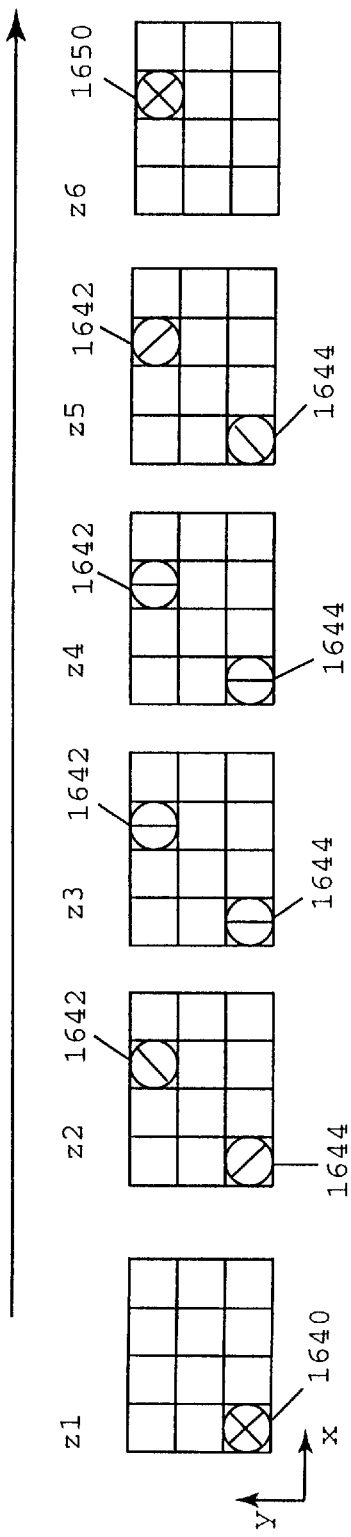
FIGS. 17A and 17B illustrate polarization states for light beams at various points along different optical paths through the circulator illustrated in FIGS. 16A and 16B, for forward and reverse directions respectively.

The operation of the circulator 1600 is further described with reference to FIGS. 17A and 17B, which show the polarization states of a beam travelling respectively along forward and backward directions. The polarization states are shown for the beam, or beams, at surfaces denoted z1, z2. . . . z6, and are presented as viewed looking along the zaxis, in the +z direction.

The forward-travelling beam 1640 from the first fiber 1601 a enters the non-reciprocal module 1604 from the left side. The x and y axes illustrated in FIGS. 17A and 17B correspond to the y and x axes shown in FIGS. 16A and 16B respectively.

The position denoted "z1" represents the first face of the first birefringent crystal 1620. The beam 1640 entering the first birefringent crystal 120 in the forward, or +z, direction is a mixture of two orthogonal polarizations, as shown by the polarization indicator for the plane z1 illustrated in FIG. 17A.

The beam 1640 is split, in a direction approximately at 45° to the y-axis and x-axis, into an upper beam 1642 and a lower beam 1644. The first birefringent crystal 1620 is sufficiently long that the upper and lower beams 1642 and 1644 are separated when they exit the first birefringent crystal 1620.

After passing out of the first birefringent crystal 1620, the upper and lower beams 1642 and 1644 are incident on the first non-reciprocal polarization rotator 1626, at z2.

In this embodiment, the Faraday rotator 1626b rotates the polarization direction of the upper beam 1642 by +45° and the Faraday rotator 1626a rotates the polarization direction of the lower beam 1644 by −45°, so that the polarization directions of the upper and lower beams 1642 and 1644 exit the first non-reciprocal rotator 1626 with parallel polarization directions, as illustrated for the plane z3.

The upper and lower beams 1642 and 1644 pass through the second birefringent crystal, to emerge at plane z4 with the same polarization states and positions as at plane z3.

The upper and lower beams 1642 and 1644 are incident on the second non-reciprocal polarization rotator 1628. In this embodiment, the Faraday rotator 1628b rotates the polarization direction of the upper beam 1642 by +45° and the Faraday rotator 1628a rotates the polarization direction of the lower beam 1644 by −45°, so that to the polarization directions of the upper and lower beams 1642 and 1644 exit the second non-reciprocal polarization rotator 1628 with orthogonal polarization directions, as illustrated for the plane at z5. Furthermore, the polarization direction of each beam 1642 and 1642 has received a cumulative rotation of about 90° since exiting the first birefringent crystal 1620.

The upper and lower beams 1642 and 1644 passes into the third birefringent crystal 1624. The upper beam 1642 now has the orthogonal polarization to the polarization it had passing through the first birefringent crystal. Likewise, the polarization of the lower beam 1644 is orthogonal to the polarization it had in the first birefringent crystal 1620. Accordingly, the beams are combined in the third birefringent crystal 1624 to produce a single output beam 1650, as shown at plane z6, which is coupled to the second fiber 1601b.

Figure 17B:
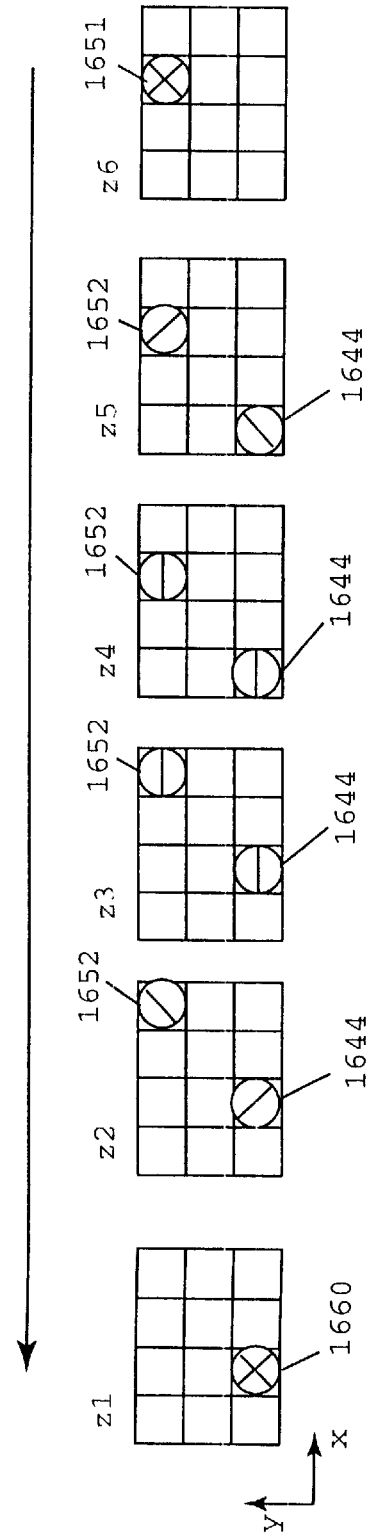

We now examine the passage of light through the circulator in the reverse, or −z, direction, with reference to the polarization states shown in FIG. 17B. A beam 1651 enters the non-reciprocal module 1604 from the second fiber 1601b, as illustrated for plane z6 . The beam 1651 is split by the third birefringent crystal 1624 into upper and lower beams 1652 and 1654, as illustrated for the plane z5.

On passing through the Faraday rotator 1628b, the polarization of the upper beam 1652 is rotated through an angle of +45°. On passing through the Faraday rotator 1628a, the polarization of the lower beam 1654 is rotated through an angle of −45°. Therefore, at plane z4, the polarization directions of the upper and lower beams 1652 and 1654 are parallel and orthogonal to the polarization of the forward travelling beams at plane z4.

The upper and lower beams 1652 and 1654 enter the second birefringent crystal, where they are each translated in the x direction along paths 1653 and 1655 respectively. The beams 1652 and 1654 emerge from the second birefringent crystal 1622, at plane z3, having experienced an x-translation. The amount by which the beams 1652 and 1654 are translated within the second birefringent crystal 1622 is not drawn to scale relative to the amount that the beams are translated within the first and third birefringent crystals 1620 and 1624.

The upper and lower beams 1652 and 1654 are then respectively rotated by +45° and −45° in respective Faraday rotators 1626b and 1626a, so as to have orthogonal polarizations once more, illustrated for plane z2.

The upper and lower beams 1652 and 1654 are then combined in the first birefringent crystal 1620 to produce an output beam 1660, at plane z1. The output beam 1660 is coupled to the third fiber 1601c.

A general description of the circulator 1600 is that a beam travels through the circulator in the forward direction without receiving any translation within the second birefringent crystal. The component beams of the first beam pass through the second birefringent crystal in the forward direction with a first polarization state. On passing through the second birefringent crystal in the reverse direction, and with a polarization state orthogonal to the first polarization state, the backward travelling component beams receive a lateral translation. Therefore, forward and backward beams travelling along the same path are separable.

It will be appreciated that the relative orientations of some components may be changed without affecting the operation of the circulator 1600. For example, the orientation of the second birefringent crystal 1622 may be such that forward-travelling beams are translated, while backward-travelling beams remain untranslated. Additionally, the first non-reciprocal polarization rotator 1626 may be arranged to rotate the polarization of the forward-travelling upper and lower beams 1642 and 1644 by approximately +45° and +45° respectively, i.e. in a clockwise direction rather than counter-clockwise. Furthermore, the direction in which the second non-reciprocal polarization rotator 1628 rotates the beams passing therethrough may be different from the direction of rotation of the first non-reciprocal polarization rotator 1626. For example, the Faraday rotator 1626*b* may be arranged to rotate the polarization of the upper beam 1642 by +45°, while the Faraday rotator 1628*b* is arranged to rotate the polarization of the upper beam 1642 by −45°. It will be appreciated that, in such a case, the orientation of the walk-off plane in the third birefringent crystal 1624 is selected to combine the upper and lower beams 1642 and 1644.

The circulator 1600 operates as an eight port circulator. The light that enters the circulator 1600 through fiber 1601*a*, exits through fiber 1601*b*. The light entering through fiber 1601*b* exits through fiber 1601*c*. Likewise, the light entering the circulator 1600 through fiber 1601*c*, exits through fiber 1601*d*, while the light entering through fiber 1601*d*, exits through fiber 1601*e*. In this manner, light passes from fiber 1601*e* to fiber 1601*f*, from fiber 1601*f* to fiber 1601*g* and from fiber 1601*g* to fiber 1601*h*. It will be appreciated that more fibers may be added may be added to the circulator 1600 to couple to additional light paths through the circulator. The limit to the number of fibers is set by practical constraints such as crystal size, optical quality of the components, and maximum allowable package size. In summary, a compact, multiport, in-line circulator is possible using a small number of components, none of which have epoxied faces in the beam path, and which avoids the use of waveplates.

Figure 18A:
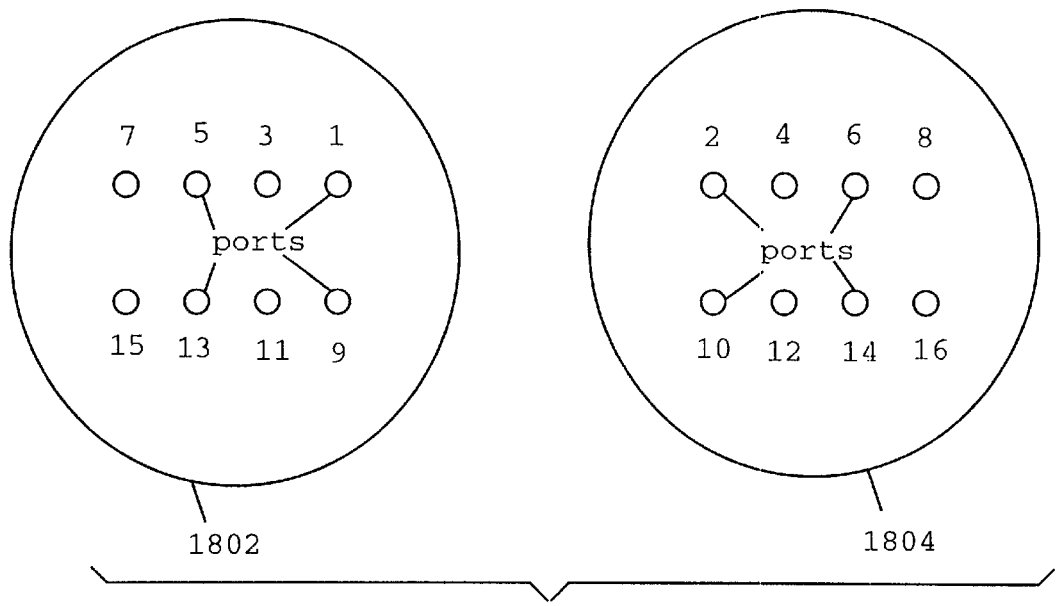
FIG. 18A schematically illustrates ports arranged in two dimensions at either end of an in-line circulator.

An in-line circulator may be adapted to have ports arranged in a two-dimensional pattern at either end, and is not restricted to the one-dimensional pattern of the in-line circulator 1600. An example of a two-dimensional port arrangement is schematically illustrated in FIG. 18A, which shows an arrangement of ports 1–16 distributed at the first and second ends 1802 and 1804 of an in-line circulator. In this arrangement, light is enabled to pass from port to port in numerical order, for ports arranged within the same row. For example, light is enabled to pass among ports in the upper row from port 1 to port 2, from port 2 to port 3, from port 3 to port 4, from port 4 to port 5, from port 5 to port 6, from port 6 to port 7 and from port 7 to port 8. Likewise, light is enabled to pass among ports in the lower row, i.e. from port 9 to port 10, and so on.

The ports may be arranged in an array. The illustrated array is a 4×2 array, i.e. four ports along each row, with two rows. However, any suitable N×M array may be used. The ports are not required, however, to be arranged in an array. For example, one row may have more ports than another row, or the ports in one row may be offset in direction along the row relative to the ports of another row.

Figure 18B:
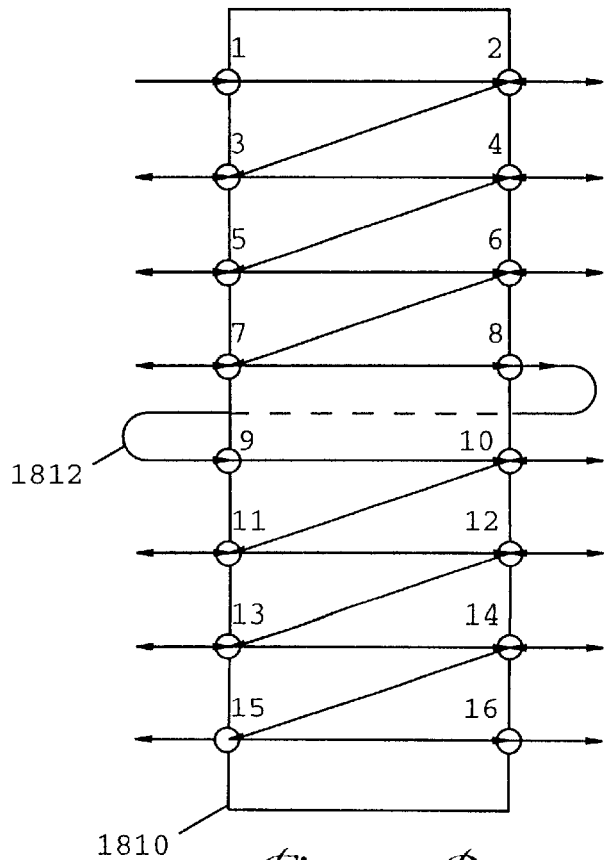
FIG. 18B is a schematic diagram showing the relationship between different ports of an in-line circulator.

A schematic of the circulator having two dimensional port arrangements is illustrated in FIG. 18B, which shows light passing from one port to the next. The port numbering is equivalent to that illustrated in FIG. 18A. Additionally, a fiber 1812, or other external light path, may be used to couple light from port 8 to port 9, so that light may be passed from the upper row to the lower row. This enables a sixteen-port, dual row in-line device to act as a 14 port circulator.

It will be appreciated that other two-dimensional port patterns may be used with the in-line circulator, for example having more than two rows. Furthermore, one subset of ports may be used independently of another subset, to provide the user with one or more smaller, independent circulators. For example, ports 1, 2 and 3 may be used for a three port circulator, while ports 5, 6 and 7 may be used for another three port circulator. Likewise, ports 9, 10 and 11 may be used for a three port circulator.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical circulator, comprising:
   a birefringent splitting and combining element configured to split a beam of light propagating in a forward direction into first and second light paths having mutually orthogonal polarizations;
   an inverting reflector configured to reflect light travelling forward along the first light path to travel in a reverse direction along a third light path parallel to the first light path, and to reflect light travelling forward along the second light path into a reverse direction along a fourth light path parallel to the second light path,
   a first non-reciprocal polarization rotator configured to rotate polarization directions of light propagating along the first, second, third and fourth light paths from the first splitting and combining element by approximately 45°; and
   a birefringent translating unit configured to laterally displace a light beam propagating therethrough with a first polarization direction and to transmit without lateral displacement a light beam having a second polarization direction orthogonal to the first polarization direction;
   wherein light propagating through the birefringent translating unit along one of the second and third light paths is laterally displaced and light propagating through the birefringent translating unit along the other of the second and third light paths is not laterally displaced, and light propagating along the third and fourth paths is combined into a single output path in the birefringent splitting and combining element.

2. The optical circulator of claim 1, wherein the first non-reciprocal polarization rotator is a Faraday rotator configured to rotate the polarization directions of light propagating along the two beam paths in a same direction by approximately 45°.

3. The optical circulator of claim 1, further comprising a non-reciprocal polarization rotator between the birefringent translating element and the inverting reflector configured to rotate the polarization directions of light propagating along the two beam paths in a same direction be approximately 45°, and wherein the first non-reciprocal polarization rotator includes first and second Faraday rotators configured to rotate the polarization directions of light propagating along respective first and second light paths by approximately 45° in opposing directions.

4. The optical circulator of claim 1, wherein the birefringent translating unit has upper and lower portions, the first and fourth light paths pass through one of the upper and lower portions and the second and third light paths pass through the other of the upper and lower portions, the upper portion including a birefringent crystal.

5. The optical circulator of claim 4, wherein the birefringent translating unit includes a non-birefringent portion and the first and fourth light paths pass through the non-birefringent portion.

6. The optical circulator of claim 1, wherein the birefringent translating unit includes a non-birefringent transmissive optical element disposed along the first light path between the non-reciprocal polarization rotator and the inverting reflector.

7. The optical circulator of claim 1, further comprising first, second and third ports on an input side of the birefringent splitting and combining unit, the second port disposed to receive light reflected from the first port and the third port disposed to receive light reflected from the second port.

8. The optical circulator of claim 7, wherein the first, second and third ports each include a respective optical fiber coupled to transmit light to the input face of the birefringent splitting and combining element.

9. The optical circulator of claim 7, further comprising a fourth port coupled to the input side of the first birefringent splitting and combining crystal to receive light from the third port.

10. The optical circulator of claim 1, further comprising a plurality of optical fibers coupled to parallel beam paths on an input side of the birefringent splitting and combining element by a parallelizing module including:
  a first focusing element coupled to receive output light beams from output ends of the plurality of optical fibers and having a first focusing power selected to direct the output light beams to intersect a first focusing element axis, and
  a second focusing element spaced apart from the first focusing element by a first separation distance along the first optical axis and positioned to receive the light beams from the first focusing element, the second focusing element having a second focusing power, the first separation distance being selected to parallelize the light beams received from the first focusing element.

11. The optical circulator of claim 1, further comprising a linear array of optical ports coupled to an input face of the birefringent splitting and combining element.

12. The optical circulator of claim 11, wherein individual ports of the first array of ports are aligned to receive light coupled from a neighboring port via the inverting reflector.

13. The optical circulator of claim 1, further comprising a plurality of ports coupled to an input face of the first birefringent splitting and combining element and arranged in a regular two dimensional pattern.

14. The optical circulator of claim 13, wherein ports within a same row are aligned to receive light coupled from an adjacent port in the same row via the inverting reflector.

15. The optical circulator of claim 14, wherein a port at an end of a first row of the two dimensional array is optically coupled to a port at an opposite end of a second row.

16. The optical circulator of claim 1, wherein the inverting reflector is a right-angled prism configured to reflect light from the first beam path to the third beam path and light from the second beam path to the fourth beam path.

17. The optical circulator of claim 1, wherein the inverting reflector includes a lens and a reflecting surface configured to reflect light from the first beam path to the third beam path and light from the second beam path to the fourth beam path.

18. An optical circulator, comprising:
  a birefringent splitting and combining element configured to split a beam of light propagating in a forward direction from a first port into first and second light paths having mutually orthogonal polarizations;
  an inverting reflector configured to reflect light travelling forward along the first light path to travel in a reverse direction along a third light path parallel to the first light path, and to reflect light travelling forward along the second light path into a reverse direction along a fourth light path parallel to the second light path,
  a first non-reciprocal polarization rotator configured to rotate polarization directions of light propagating along the first, second, third and fourth light paths by approximately 45°; and
  a birefringent translation unit between the birefringent splitting and combining element and the inverting reflector, having a first birefringent translating element disposed in the second and third light paths configured to laterally displace a light beam propagating therethrough having a first polarization direction, and to transmit, without lateral displacement, a light beam propagating therethrough having a second polarization direction orthogonal to the first polarization direction, and having a non-birefringent element disposed in the first and fourth light paths;
  wherein light propagating along the third and fourth paths is combined into a single output path in the birefringent splitting and combining element, the single output path being coupled to a second port.

19. The optical circulator of claim 18, wherein the birefringent splitting and combining element includes two birefringent crystals having different walk-off directions and the non-reciprocal polarization rotator includes two Faraday rotators, a first Faraday rotator configured to rotate light passing therethrough in a first rotation direction and the second Faraday rotator configured to rotate light passing therethrough in a second rotation direction opposite from the first rotation direction.

20. The optical circulator of claim 18, wherein light propagating along the third light path in the birefringent translation unit is polarized along the first polarization direction and light propagating along the fourth light path in the birefringent translation unit is polarized along the second polarization direction.

21. The optical circulator of claim 18, wherein the birefringent splitting and combining element includes a birefringent crystal, the non-reciprocal polarization rotator includes a Faraday rotator and the first, second, third and fourth beam paths pass through the birefringent crystal and the Faraday rotator.

22. The optical circulator of claim 18, wherein light entering the circulator through the second port is transmitted to a third port, the third port being separated from the first port in a direction parallel to a lateral displacement in the birefringent translation unit.

23. The optical circulator of claim 18, further comprising a third port coupled to the birefringent splitting and combining element to receive light from the second port and a fourth port coupled to the birefringent splitting and combining element to receive light from the third port, wherein the first and third ports are positioned on first port row and the second and fourth ports are positioned on a second port row parallel to the first port row.

24. An optical circulator, comprising:
 a birefringent splitting and combining element configured to split a beam of light propagating in a forward direction into first and second light paths having mutually orthogonal polarizations;
 a non-reciprocal polarization rotator configured to rotate polarization directions of light propagating along the first and second light paths from the splitting and combining element by approximately 45°;
 a birefringent translating unit having upper and lower portions, the first light path passing through the lower portion and the second light path passing through the upper portion; and
 an inverting reflector configured to reflect light travelling forward from the lower portion to travel backward through the upper portion and to reflect light travelling forward form the upper portion backward through the lower portion;
 wherein one of light propagating forward and light propagating backward through the upper portion propagates through the birefringent translating unit as an extraordinary ray, and the other of the light propagating forward and the light propagating backward through the upper portion propagates through the birefringent translating unit as an ordinary ray.

25. An optical circulator as recited in claim 24, wherein the birefringent translating unit includes a birefringent translating element in the upper portion and a non-birefringent element in the lower portion and birefringent translating element is configured to transversely displace a light beam passing therethrough with extraordinary polarization and to transmit, without transverse displacement, a light beam passing therethrough with ordinary polarization.

26. An optical circulator, comprising:
 a birefringent splitting and combining element configured to split orthogonally polarized beams of light propagating along an element input axis into first and second light paths;
 a first non-reciprocal polarization rotator configured to rotate polarization directions of light propagating along the first and second light paths from the first splitting and combining element by approximately 45° in respectively opposing directions;
 a birefringent translating element disposed along the first and second light paths and configured to laterally displace a light beam having a first polarization direction propagating therethrough and to transmit without lateral displacement a light beam having a second polarization direction orthogonal to the first polarization direction;
 a second non-reciprocal polarization rotator configured to rotate polarization directions of light propagating along the first and second light paths from the translating element by approximately 45°; and
 a reflector configured to reflect light propagating along the first and second light paths in a reverse direction along the first and second light paths respectively.

27. The optical circulator of claim 26, further comprising first, second and third ports on an input side of the birefringent splitting and combining element, the second port disposed to receive light reflected from the first port and the third port disposed to receive light reflected from the second port.

28. The optical circulator of claim 27, wherein the first, second and third ports each include a respective optical fiber coupled to transmit light to the input face of the birefringent splitting and combining element.

29. The optical circulator of claim 27, further comprising a fourth port coupled to the input side of the first birefringent splitting and combining crystal to receive light from the third port.

30. The optical circulator of claim 27, wherein the reflector is a reflecting surface disposed on a back surface of the second non-reciprocal polarization rotator.

31. The optical circulator of claim 27, further comprising
 a plurality of optical fibers coupled to parallel beam paths on an input side of the birefringent splitting and combining element by a parallelizing module having
 a first focusing element coupled to receive output light beams from output ends of the plurality of optical fibers and having a first focusing power selected to direct the output light beams to intersect a first focusing element axis, and
 a second focusing element spaced apart from the first focusing element by a first separation distance along the first optical axis and positioned to receive the light beams from the first focusing element, the second focusing element having a second focusing power, the first separation distance being selected to parallelize the light beams received from the first focusing element.

32. The optical circulator of claim 27, further comprising an array of ports forming a linear arrangement of parallel beam paths through the birefringent splitting and combining element.

33. The optical circulator of claim 22, wherein individual ports of the first array of ports are aligned to receive light coupled from a neighboring port via the reflecting element.

34. The optical circulator of claim 27, further comprising a plurality of ports coupled to an input face of the first birefringent splitting and combining element and arranged in rows and columns to form a two dimensional array.

35. The optical circulator of claim 34, wherein ports within a same row are aligned to receive light coupled from an adjacent port in the same row via the reflector.

36. The optical circulator of claim 34, wherein a port at an end of one row of the two dimensional array is optically coupled to a port at an opposite end of another row.

37. An optical circulator, comprising:
 first and second light coupling modules, each light coupling module including
  a first focusing element optically couplable to output ends of respective first and second pluralities of optical fibers, and having a first focusing power selected to direct light beams from the respective plurality of optical fibers to intersect a first focusing element axis, and
  a second focusing element spaced apart from the first focusing element by a first separation distance along the first optical axis and positioned to receive the light beams from the first focusing element, the second focusing element having a second focusing power, the first separation distance being selected to parallelize the light beams received from the first focusing element; and
 a non-reciprocal module, including a first birefringent splitting and combining element configured to split an input beam of light propagating along an element input axis from the second focusing element of the first optical coupling module into orthogonally polarized first and second light paths;

a first non-reciprocal polarization rotator configured to rotate polarization directions of light propagating along the first and second light paths from the first splitting and combining element by approximately 45° in respectively opposing directions;

a birefringent translating element disposed along the first and second light paths and configured to laterally displace a light beam having a first polarization direction propagating therethrough and to transmit without lateral displacement a light beam having a second polarization direction orthogonal to the first polarization direction;

a second non-reciprocal polarization rotator configured to rotate electric field vectors of light propagating along the first and second light paths from the translating element by approximately 45° in opposite directions; and a second birefringent splitting and combining element configured to combine light beams propagating along the first and second light paths into an output light beam directed to the second focusing element of the second optical coupling module.

38. The optical circulator of claim 37, further comprising first and second arrays of ports forming respective linear arrangements on respective input sides of the first and second optical coupling modules.

39. The optical circulator of claim 38, wherein the first and second arrays of ports are scalable.

40. The optical circulator of claim 37, further comprising first and second arrays of ports forming respective two dimensional arrangements on respective input sides of the first and second optical coupling modules.

41. The optical circulator of claim 40, wherein the first and second arrays of ports are scalable.

42. The optical circulator of claim 37, further comprising optical fibers coupled to ports of the first and second optical coupling modules.

43. The optical circulator of claim 37, wherein the first non-reciprocal polarization rotator includes first and second Faraday rotators configured to rotate the polarization directions of the light propagating along the first and second light paths respectively.

44. The optical circulator of claim 37, wherein the second non-reciprocal polarization rotator includes third and fourth Faraday rotators configured to rotate the polarization directions of the light propagating along the first and second light paths respectively.

45. An optical circulator, comprising:

a birefringent splitting and combining element configured to split a beam of light propagating in a forward direction into first and second light paths having mutually orthogonal polarizations;

a first non-reciprocal polarization rotator configured to rotate polarization directions of light propagating along the first and second light paths from the first splitting and combining element by approximately 45°;

a birefringent translating unit having first and second portions, the first portion disposed on the first beam path and configured to laterally displace a light beam propagating therethrough with a first polarization direction and to transmit without lateral displacement a light beam having a second polarization direction orthogonal to the first polarization direction, the second portion disposed on the second beam path and being non-birefringent; and a reflecting unit configured to reflect light propagating forward along the first path to propagate in a backwards direction through the second portion of the birefringent translation unit and to reflect light propagating forward along the second light path to propagate backward through the first portion of the birefringent translation unit.

46. The optical cirulator of claim 45, wherein light propagating forwards along the first light path propagate with ordinary polarization through the first portion of the birefringent translation unit pagating backwards through the first portion of the birefrinent translation unit propagates with extraordinary polarization.

47. The optical circulator of claim 45, wherein light propagating forwards along the first light path propagate with ordinary polarization through the first portion of the birefringent translation unit and light propagating backwards through the first portion of the birefringent translation unit propagates with ordinary polarization.

\* \* \* \* \*